(12) United States Patent
Sengoku

(10) Patent No.: US 9,735,948 B2
(45) Date of Patent: Aug. 15, 2017

(54) MULTI-LANE N-FACTORIAL (N!) AND OTHER MULTI-WIRE COMMUNICATION SYSTEMS

(71) Applicant: QUALCOMM Incorporated, San Diego, CA (US)

(72) Inventor: Shoichiro Sengoku, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/875,592

(22) Filed: Oct. 5, 2015

(65) Prior Publication Data

US 2016/0028534 A1 Jan. 28, 2016

Related U.S. Application Data

(63) Continuation-in-part of application No. 14/250,119, filed on Apr. 10, 2014, now Pat. No. 9,203,599, and
(Continued)

(51) Int. Cl.
*H04L 7/00* (2006.01)
*H04L 7/033* (2006.01)
(Continued)

(52) U.S. Cl.
CPC .......... *H04L 7/0008* (2013.01); *H04L 7/0087* (2013.01); *H04L 7/0331* (2013.01);
(Continued)

(58) Field of Classification Search
CPC ..... H04L 7/0008; H04L 12/2832; H04L 7/10; H04L 25/0272; H04L 7/0087
(Continued)

(56) References Cited

U.S. PATENT DOCUMENTS 4,280,221 A 7/1981 Chun et al.
4,644,547 A 2/1987 Vercellotti et al.
(Continued)

FOREIGN PATENT DOCUMENTS

CN 101083475 A 12/2007
DE 3329773 A1 2/1985
(Continued)

OTHER PUBLICATIONS

Bell A G., et al., "WAM 7.1: A Single Chip NMOS Ethernet Controller", IEEE: International Solid—State Circuits Conference, XX, XX, Feb. 23, 1983 (Feb. 23, 1983), XP001 039599, pp. 13-78.
(Continued)

*Primary Examiner* — Emmanuel Bayard
(74) *Attorney, Agent, or Firm* — Loza & Loza LLP

(57) ABSTRACT

System, methods and apparatus are described that facilitate communication of data over a multi-wire data communications link, particularly between two devices within an electronic apparatus. A receiving device receives a sequence of symbols over a multi-wire link. The receiving device further receives a clock signal via a dedicated clock line, wherein the dedicated clock line is separate from, and in parallel with, the multi-wire link. The receiving device decodes the sequence of symbols using the clock signal. In an aspect, a second clock signal is embedded in guaranteed transitions between pairs of consecutive symbols in the sequence of symbols. Accordingly, the receiving device decodes the sequence of symbols using the clock signal received via the dedicated clock line while ignoring the second clock signal.

30 Claims, 22 Drawing Sheets

Related U.S. Application Data a continuation-in-part of application No. 14/252,450, filed on Apr. 14, 2014, now Pat. No. 9,178,690, and a continuation-in-part of application No. 14/491,884, filed on Sep. 19, 2014.

(60) Provisional application No. 61/886,567, filed on Oct. 3, 2013, provisional application No. 61/886,556, filed on Oct. 3, 2013.

(51) Int. Cl.
  *H04L 25/02* (2006.01)
  *H04L 7/027* (2006.01)

(52) U.S. Cl.
  CPC ........ *H04L 25/0272* (2013.01); *H04L 7/0276* (2013.01); *H04L 7/033* (2013.01)

(58) Field of Classification Search
  USPC ................................. 375/219–222, 355–356
  See application file for complete search history.

(56) References Cited

U.S. PATENT DOCUMENTS

| | | | |
|---|---|---|---|
| 4,839,907 A | 6/1989 | Saneski | |
| 5,493,538 A | 2/1996 | Bergman | |
| 5,703,914 A | 12/1997 | Nakamura | |
| 5,748,043 A * | 5/1998 | Koslov | G06F 7/68 |
| | | | 327/159 |
| 5,835,498 A * | 11/1998 | Kim | G06F 13/4018 |
| | | | 348/423.1 |
| 5,859,669 A * | 1/1999 | Prentice | G09G 5/18 |
| | | | 341/53 |
| 5,862,180 A | 1/1999 | Heinz | |
| 5,959,568 A | 9/1999 | Woolley | |
| 6,028,639 A * | 2/2000 | Bhatt | H04N 5/46 |
| | | | 348/441 |
| 6,320,406 B1 | 11/2001 | Morgan et al. | |
| 6,320,437 B1 | 11/2001 | Ma | |
| 6,477,205 B1 * | 11/2002 | Doblar | H04L 25/0278 |
| | | | 326/60 |
| 6,526,112 B1 | 2/2003 | Lai | |
| 6,556,628 B1 | 4/2003 | Poulton et al. | |
| 6,564,269 B1 * | 5/2003 | Martin | G09G 5/006 |
| | | | 348/E7.026 |
| 6,624,766 B1 | 9/2003 | Possley et al. | |
| 6,728,908 B1 | 4/2004 | Fukuhara et al. | |
| 6,799,239 B2 * | 9/2004 | VanKrevelen | G06F 13/4059 |
| | | | 710/100 |
| 6,836,522 B1 | 12/2004 | Wakayama | |
| 6,845,131 B1 * | 1/2005 | Ward | H04L 25/0272 |
| | | | 375/295 |
| 6,874,097 B1 | 3/2005 | Aliahmad et al. | |
| 6,933,866 B1 | 8/2005 | Weitz | |
| 7,061,939 B1 | 6/2006 | Chengson et al. | |
| 7,072,355 B2 * | 7/2006 | Kizer | H03M 9/00 |
| | | | 370/250 |
| 7,076,377 B2 | 7/2006 | Kim et al. | |
| 7,158,593 B2 * | 1/2007 | Kim | H04L 5/06 |
| | | | 375/354 |
| 7,167,527 B1 | 1/2007 | Park et al. | |
| 7,190,754 B1 | 3/2007 | Chang et al. | |
| 7,313,208 B2 * | 12/2007 | Frahm | H04B 1/0475 |
| | | | 348/470 |
| 7,339,502 B2 | 3/2008 | Furtner | |
| 7,358,869 B1 | 4/2008 | Chiarulli et al. | |
| 7,395,347 B2 | 7/2008 | Nemawarkar et al. | |
| 7,463,680 B2 | 12/2008 | Buckwalter et al. | |
| 7,502,953 B2 | 3/2009 | Boecker et al. | |
| 7,515,668 B1 | 4/2009 | Rokhsaz | |
| 7,667,500 B1 | 2/2010 | Alfke | |
| 7,715,509 B2 | 5/2010 | Stojanovic et al. | |
| 7,741,876 B2 | 6/2010 | Fusayasu et al. | |
| 7,781,677 B2 | 8/2010 | Matsubara et al. | |
| 7,791,370 B1 * | 9/2010 | Hoang | G06F 1/10 |
| | | | 326/38 |
| 7,821,428 B2 * | 10/2010 | Leung | G06F 13/4072 |
| | | | 341/100 |
| 7,844,762 B2 * | 11/2010 | Banks | G06F 3/14 |
| | | | 709/208 |
| 7,983,347 B2 | 7/2011 | Hamada et al. | |
| 7,986,732 B2 * | 7/2011 | Koyama | H04N 21/6332 |
| | | | 375/240.12 |
| 8,000,412 B1 | 8/2011 | Loinaz | |
| 8,005,130 B2 * | 8/2011 | Toyoda | H04L 7/0337 |
| | | | 375/219 |
| 8,041,845 B2 * | 10/2011 | Yang | G06F 1/3203 |
| | | | 348/730 |
| 8,159,376 B2 | 4/2012 | Abbasfar | |
| 8,184,651 B2 * | 5/2012 | Chan | H04L 49/30 |
| | | | 370/419 |
| 8,184,760 B2 | 5/2012 | Chien et al. | |
| 8,230,118 B2 * | 7/2012 | Toba | G09G 5/006 |
| | | | 710/2 |
| 8,264,253 B2 | 9/2012 | Tian et al. | |
| 8,284,848 B2 | 10/2012 | Nam et al. | |
| 8,446,903 B1 | 5/2013 | Ranganathan et al. | |
| 8,599,913 B1 * | 12/2013 | Brown | G06F 13/4027 |
| | | | 375/232 |
| 8,606,184 B1 * | 12/2013 | Luthra | H04W 16/14 |
| | | | 370/229 |
| 8,621,128 B2 | 12/2013 | Radulescu et al. | |
| 8,659,957 B2 | 2/2014 | Sekine | |
| 8,660,213 B1 | 2/2014 | Huynh | |
| 8,686,754 B2 | 4/2014 | Chopra et al. | |
| 8,687,752 B2 * | 4/2014 | Park | H03L 7/091 |
| | | | 375/354 |
| 8,798,189 B2 * | 8/2014 | Kirkpatrick | H03M 5/145 |
| | | | 327/52 |
| 8,848,810 B2 | 9/2014 | Lee et al. | |
| 8,861,553 B2 * | 10/2014 | Chen | H04L 1/0061 |
| | | | 370/474 |
| 8,959,268 B2 * | 2/2015 | Hiraoka | H03M 9/00 |
| | | | 710/105 |
| 9,030,976 B2 * | 5/2015 | Lee | H04N 5/44 |
| | | | 370/282 |
| 9,071,220 B2 | 6/2015 | Sengoku et al. | |
| 9,178,690 B2 | 11/2015 | Sengoku | |
| 9,179,117 B2 * | 11/2015 | Hoshino | H04N 9/87 |
| 9,203,599 B2 | 12/2015 | Sengoku | |
| 9,219,560 B2 * | 12/2015 | Hummel | H04J 3/047 |
| 9,235,540 B1 * | 1/2016 | Langhammer | G06F 13/36 |
| 9,244,872 B2 * | 1/2016 | Barbiero | G06F 13/4022 |
| 9,319,143 B2 * | 4/2016 | El-Ahmadi | H04B 10/2569 |
| 2002/0005841 A1 * | 1/2002 | Jung | G09G 5/006 |
| | | | 345/204 |
| 2003/0099135 A1 | 5/2003 | Stubbs | |
| 2004/0028164 A1 * | 2/2004 | Jiang | H04L 12/46 |
| | | | 375/371 |
| 2004/0203559 A1 | 10/2004 | Stojanovic et al. | |
| 2005/0053171 A1 | 3/2005 | Pickering et al. | |
| 2005/0069071 A1 | 3/2005 | Kim et al. | |
| 2005/0104649 A1 | 5/2005 | Yonezawa | |
| 2005/0140415 A1 | 6/2005 | Hazucha et al. | |
| 2005/0207280 A1 * | 9/2005 | Fowler | H03M 9/00 |
| | | | 368/10 |
| 2005/0218953 A1 | 10/2005 | Slawecki | |
| 2005/0219083 A1 * | 10/2005 | Boomer | H04L 7/0008 |
| | | | 341/100 |
| 2006/0006902 A1 | 1/2006 | Sagiv | |
| 2006/0061494 A1 | 3/2006 | Hosaka et al. | |
| 2006/0098596 A1 * | 5/2006 | Park | H04H 20/61 |
| | | | 370/329 |
| 2006/0123177 A1 * | 6/2006 | Chan | H03L 7/06 |
| | | | 710/306 |
| 2006/0132335 A1 | 6/2006 | Kojima | |
| 2006/0140321 A1 | 6/2006 | Tell et al. | |
| 2006/0168615 A1 * | 7/2006 | Igler | H04N 21/4223 |
| | | | 725/32 |
| 2007/0073932 A1 | 3/2007 | Pike et al. | |

(56) References Cited

U.S. PATENT DOCUMENTS

| | | | |
|---|---|---|---|
| 2007/0153916 A1* | 7/2007 | Demircin | H04N 21/2365 375/240.26 |
| 2007/0188187 A1 | 8/2007 | Oliva et al. | |
| 2007/0241836 A1 | 10/2007 | Miller | |
| 2008/0063127 A1 | 3/2008 | Hayashi et al. | |
| 2008/0159432 A1 | 7/2008 | Ng | |
| 2008/0165732 A1 | 7/2008 | Kim et al. | |
| 2008/0212709 A1 | 9/2008 | Wiley et al. | |
| 2009/0037006 A1* | 2/2009 | Hiratsuka | G11B 27/034 700/94 |
| 2009/0080584 A1 | 3/2009 | Hamano et al. | |
| 2009/0195699 A1 | 8/2009 | Hamada et al. | |
| 2009/0243681 A1 | 10/2009 | Zerbe et al. | |
| 2010/0001758 A1 | 1/2010 | Dreps et al. | |
| 2010/0002819 A1 | 1/2010 | Conner | |
| 2010/0027607 A1 | 2/2010 | Kwasniewski et al. | |
| 2010/0040169 A1 | 2/2010 | Abbasfar | |
| 2010/0111207 A1 | 5/2010 | Suda et al. | |
| 2010/0142723 A1* | 6/2010 | Bucklen | H04R 3/02 381/81 |
| 2010/0180143 A1 | 7/2010 | Ware et al. | |
| 2010/0183053 A1* | 7/2010 | Tran | H04L 5/0008 375/219 |
| 2010/0215118 A1 | 8/2010 | Ware et al. | |
| 2010/0264967 A1 | 10/2010 | Lee, Jr. et al. | |
| 2011/0013707 A1 | 1/2011 | Walker et al. | |
| 2011/0066778 A1* | 3/2011 | Chan | H03L 7/06 710/106 |
| 2011/0176646 A1 | 7/2011 | Pal et al. | |
| 2011/0197086 A1 | 8/2011 | Rivoir | |
| 2011/0206355 A1* | 8/2011 | Toba | H04N 5/44 386/355 |
| 2011/0216863 A1 | 9/2011 | Tomita et al. | |
| 2011/0249781 A1 | 10/2011 | Guillot et al. | |
| 2012/0020660 A1 | 1/2012 | Le Taillandier De Gabory et al. | |
| 2012/0027203 A1* | 2/2012 | Inada | H04L 9/0662 380/42 |
| 2012/0213299 A1 | 8/2012 | Cronie et al. | |
| 2012/0223754 A1 | 9/2012 | Lewis | |
| 2012/0224656 A1 | 9/2012 | Aoki | |
| 2012/0307886 A1* | 12/2012 | Agarwal | H04W 4/18 375/240.02 |
| 2012/0326783 A1 | 12/2012 | Mathe et al. | |
| 2013/0127645 A1 | 5/2013 | Shibata | |
| 2013/0225067 A1 | 8/2013 | Card et al. | |
| 2013/0241759 A1 | 9/2013 | Wiley et al. | |
| 2013/0279551 A1 | 10/2013 | Fujimori et al. | |
| 2013/0294490 A1 | 11/2013 | Chandrasekaran et al. | |
| 2014/0003543 A1 | 1/2014 | Wiley et al. | |
| 2014/0065986 A1 | 3/2014 | McCallister | |
| 2014/0082397 A1* | 3/2014 | Shin | G06F 1/12 713/401 |
| 2014/0168010 A1* | 6/2014 | Mohamadi | H04B 7/18506 342/357.39 |
| 2014/0254732 A1 | 9/2014 | Sengoku et al. | |
| 2014/0254733 A1 | 9/2014 | Sengoku et al. | |
| 2014/0270026 A1 | 9/2014 | Sengoku et al. | |
| 2014/0286389 A1 | 9/2014 | Zerbe et al. | |
| 2014/0286466 A1 | 9/2014 | Sengoku et al. | |
| 2014/0348214 A1 | 11/2014 | Sengoku et al. | |
| 2015/0043358 A1 | 2/2015 | Wiley et al. | |
| 2015/0098537 A1 | 4/2015 | Sengoku | |
| 2015/0098538 A1 | 4/2015 | Wiley et al. | |
| 2015/0145600 A1 | 5/2015 | Hur et al. | |
| 2015/0220472 A1 | 8/2015 | Sengoku | |
| 2016/0065357 A1 | 3/2016 | Sengoku | |
| 2016/0127121 A1 | 5/2016 | Sengoku et al. | |
| 2016/0261400 A1 | 9/2016 | Sengoku et al. | |
| 2016/0380755 A1 | 12/2016 | Sengoku | |

FOREIGN PATENT DOCUMENTS

| | | |
|---|---|---|
| DE | 102004013093 B3 | 7/2005 |
| EP | 1385306 A1 | 1/2004 |
| GB | 2456517 A | 7/2009 |
| JP | 2003258844 A | 9/2003 |
| JP | 2005210695 A | 8/2005 |
| JP | 2006505945 A | 2/2006 |
| JP | 2006093988 A | 4/2006 |
| JP | 2008242884 A | 10/2008 |
| JP | 2011029779 A | 2/2011 |
| KR | 20020054053 A | 7/2002 |
| KR | 20100063485 A | 6/2010 |
| KR | 20140119781 A | 10/2014 |
| KR | 1020150124409 A | 11/2015 |
| WO | WO-2007009038 A2 | 1/2007 |
| WO | WO-2008109478 A2 | 9/2008 |
| WO | WO-2008151251 A1 | 12/2008 |
| WO | WO-2009086078 A1 | 7/2009 |
| WO | WO-2009111175 A1 | 9/2009 |
| WO | WO-2013138478 A1 | 9/2013 |
| WO | WO-2015050736 A1 | 4/2015 |

OTHER PUBLICATIONS

"MIPI Alliance Specification for D-PHY", Sep. 22, 2009, (Sep. 22, 2009), pp. 1-125, XP055057664 [Retrieved on Mar. 25, 2013].

Muller P., et al., "Top-Down Design of a Low-Power Multi-Channel 2.5-Gbit/s/Channel Gated Oscillator Clock-Recovery Circuit", Design, Automation and Test in Europe, 2005. Proceedings Munich, Germany Mar. 7-11, 2005, Piscataway, NJ, USA, IEEE, Mar. 7, 2005 (Mar. 7, 2005), pp. 258-263, XP010779962, ISBN: 978-0-7695-2288-3.

Partial International Search Report—PCT/US2015/014622—ISA/EPO—Apr. 21, 2015.

VITESSE, "VSC7226 Quad 3.125Gb/s Backplane Transceiver," VITESSE Semiconductor Corporation, PB-VSC7226-002, 2002, 2 Pages.

"Draft MIPI Alliance Specification for Camera Serial Interface 2 (CSI-2)" In:"Draft MIPI Alliance Specification for Camera Serial Interface 2 (CSI-2)", Apr. 2, 2009 {Apr. 2, 2009), XP055165978, 6. Camera Control Interface (CCI) 529-728.

Poulton J W., et al., "Multiwire Differential Signaling", 20030806 No. 1.1 Aug. 6, 2003 {Aug. 6, 2003), pp. 1-20, XP002610849, Retrieved from the Internet: URL:http://www.cs.unc.eduf-jpfmwire.pdf [retrieved on Nov. 23, 2010] the whole document.

Williams A., "Synopsys describes MIPI DigRF protocol for 4G mobile," Retrieved from the Internet <URL: http://www.electronicsweekly.com/news/design/eda-and-ip/synopsys-describes-mipi-digrf-protocol-for-4g-mobile-2012-03/ >, 2012, 6 Pages.

Zhu C., et al., "Multi-Machine Communication Based on I2C-Bus," Sensors & Transducers, Jul. 2014, vol. 174 (7), pp. 138-143.

Zogopoulos S., et al., "High-Speed Single-Ended Parallel Link Based on Three-Level Differential Encoding", IEEE Journal of Solid-State Circuits, IEEE Service Center, Piscataway, NJ, USA, vol. 44, No. 2, Feb. 1, 2009 {Feb. 1, 2009), pp. 549-557, XP011243176, ISSN: 0018-9200, DOI: 10.1109/JSSC.2008.2011038 the whole document.

International Search Report and Written Opinion—PCT/US2016/051131—ISA/EPO—Dec. 9, 2016.

* cited by examiner

MULTI-LANE N-FACTORIAL (N!) AND OTHER MULTI-WIRE COMMUNICATION SYSTEMS

CLAIM OF PRIORITY UNDER 35 U.S.C. §120

The present application for patent is a continuation-in-part of U.S. Non-Provisional application Ser. No. 14/250,119 entitled "Multi-Lane N-Factorial (N!) And Other Multi-Wire Communication Systems" filed on Apr. 10, 2014; and is also a continuation-in-part of U.S. Non-Provisional application Ser. No. 14/252,450 entitled "N Factorial Dual Data. Rate Clock And Data Recovery" filed on Apr. 14, 2014 which claims priority to U.S. Provisional Application No. 61/886,567 entitled "N Factorial Clock And Data Recovery With Negative Hold Time Sampling" filed on Oct. 3, 2013; and is further a continuation-in-part of U.S. Non-Provisional application Ser. No. 14/491,884 entitled "Method To Enhance MIPI D-PHY Link Rate With Minimal PHY Changes And No Protocol Changes," filed on Sep. 19, 2014 which claims priority to U.S. Provisional Application No. 61/886,556 entitled "Method To Enhance MIPI D-PHY Link Rate With Minimal PITY Changes And No Protocol Changes," filed on Oct. 3, 2013, all of which are assigned to the assignee hereof and hereby expressly incorporated by reference herein.

BACKGROUND

Field

The present disclosure relates generally to data communications interfaces, and more particularly, multi-lane multi-wire data communication interfaces.

Background

Manufacturers of mobile devices, such as cellular phones, may obtain components of the mobile devices from various sources, including different manufacturers. For example, an application processor in a cellular phone may be obtained from a first manufacturer, while the display for the cellular phone may be obtained from a second manufacturer. The application processor and a display or other device may be interconnected using a standards-based or proprietary physical interface. For example, a display may provide an interface that conforms to the Display System Interface (DST) standard specified by the Mobile Industry Processor Interface Alliance (MIPI).

In one example, a multi-signal data transfer system may employ multi-wire differential signaling such as 3-phase or N-factorial (N!) low-voltage differential signaling (LVDS), transcoding (e.g., the digital-to-digital data conversion of one encoding type to another) may be performed to embed symbol clock information by causing a symbol transition at every symbol cycle. Embedding clock information by transcoding is an effective way to minimize skew between clock and data signals, as well as to eliminate the necessity of a phase-locked loop (PLL) to recover the clock information from the data signals.

There exists an ongoing need for optimized communications and improved data transfer rates on multi-signal communications links.

SUMMARY

Embodiments disclosed herein provide systems, methods and apparatus related to multi-lane, multi-wire interfaces.

In an aspect of the disclosure, a method of data communications at a receiving device includes receiving a sequence of symbols over a multi-wire link. Each symbol in the sequence of symbols corresponds to a signaling state of N wires of the multi-wire link, where N is an integer greater than 1. The method further includes receiving a clock signal via a dedicated clock line, wherein the dedicated clock line is separate from, and in parallel with, the multi-wire link, and decoding the sequence of symbols using the clock signal.

In an aspect of the disclosure, a second clock signal is embedded in guaranteed transitions between pairs of consecutive symbols in the sequence of symbols. Accordingly, the method decodes the sequence of symbols using the clock signal received via the dedicated clock line while ignoring the second clock signal.

In an aspect of the disclosure, the decoding includes converting the sequence of symbols to a set of data bits using the clock signal. In a further aspect of the disclosure, the converting the sequence of symbols to the set of data bits includes using a transcoder to convert the sequence of symbols to a set of transition numbers and converting the set of transition numbers to the set of data bits.

In an aspect of the disclosure, at least one line of the multi-wire link is bi-directional. The method further includes transmitting a second sequence of symbols over the at least one bi-directional line based on the clock signal received via the dedicated clock line.

In an aspect of the disclosure, the dedicated clock line is bi-directional and can be driven from any device transmitting over the multi-wire link. The method further includes transmitting a third clock signal via the dedicated clock line. The third clock signal may be associated with a transmit clock used to encode data bits into a sequence of symbols transmitted over the at least one bi-directional line.

In an aspect of the disclosure, a receiving device includes a processing circuit. A memory may be coupled to the processing circuit. The processing circuit is configured to receive a sequence of symbols over a multi-wire link, receive a clock signal via a dedicated clock line, wherein the dedicated clock line is separate from, and in parallel with, the multi-wire link, and decode the sequence of symbols using the clock signal.

In an aspect of the disclosure, an apparatus includes means for receiving a sequence of symbols over a multi-wire link, means for receiving a clock signal via a dedicated clock line, wherein the dedicated clock line is separate from, and in parallel with, the multi-wire link, and means for decoding the sequence of symbols using the clock signal.

In an aspect of the disclosure, a processor-readable storage medium has one or more instructions stored or maintained thereon. When executed by at least one processing circuit, the instructions may cause the at least one processing circuit to receive a sequence of symbols over a multi-wire link, receive a clock signal via a dedicated clock line, wherein the dedicated clock line is separate from, and in parallel with, the multi-wire link, and decode the sequence of symbols using the clock signal.

In an aspect of the disclosure, a method of data communications at a transmitting device includes encoding data bits into a sequence of symbols, optionally embedding a second clock signal in the sequence of symbols, wherein the second clock signal is embedded in guaranteed transitions between pairs of consecutive symbols in the sequence of symbols. Each symbol in the sequence of symbols corresponds to a signaling state of N wires of a multi-wire link, where N is an integer greater than 1. The method further includes transmitting the sequence of symbols over a multi-wire link, and transmitting a clock signal associated with the sequence of symbols via a dedicated clock line, wherein the dedicated clock line is separate from, and in parallel with, the multi-wire link.

In an aspect of the disclosure, the encoding the data bits includes using a transcoder to convert the data bits to a set of transition numbers and converting the set of transition numbers to obtain the sequence of symbols.

In an aspect of the disclosure, at least one line of the multi-wire link is bi-directional. The method further includes receiving a second sequence of symbols over the at least one bi-directional line based on the clock signal transmitted via the dedicated clock line.

In an aspect of the disclosure, the dedicated clock line is bi-directional and can be driven from any device transmitting over the multi-wire link. The method further includes receiving a third clock signal via the dedicated clock line. The third clock signal may be associated with a transmit clock used to encode data bits into a sequence of symbols received over the at least one bi-directional line.

In an aspect of the disclosure, a transmitting device includes a processing circuit. The processing circuit may be coupled to a memory. The processing circuit is configured to encode data bits into a sequence of symbols, optionally embed a second clock signal in the sequence of symbols, wherein the second clock signal is embedded in guaranteed transitions between pairs of consecutive symbols in the sequence of symbols, transmit the sequence of symbols over a multi-wire link, and transmit a clock signal associated with the sequence of symbols via a dedicated clock line, wherein the dedicated clock line is separate from, and in parallel with, the multi-wire link.

In an aspect of the disclosure, an apparatus includes means for encoding data bits into a sequence of symbols using a clock signal, means for optionally embedding a second clock signal in the sequence of symbols, wherein the second clock signal is embedded in guaranteed transitions between pairs of consecutive symbols in the sequence of symbols, means for transmitting the sequence of symbols over a multi-wire link, and means for transmitting a clock signal associated with the sequence of symbols via a dedicated clock line, wherein the dedicated clock line is separate from, and in parallel with, the multi-wire link.

In an aspect of the disclosure, a processor-readable storage medium has one or more instructions stored or maintained thereon. When executed by at least one processing circuit, the instructions may cause the at least one processing circuit to encode data bits into a sequence of symbols, optionally embed a second clock signal in the sequence of symbols, wherein the second clock signal is embedded in guaranteed transitions between pairs of consecutive symbols in the sequence of symbols, transmit the sequence of symbols over a multi-wire link, and transmit a clock signal associated with the sequence of symbols via a dedicated clock wherein the dedicated clock line is separate from, and in parallel with, the multi-wire link.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B, in addition, the articles "a" and "an" as used in this application and the appended claims should generally be construed to mean "one or more" unless specified otherwise or clear from the context to be directed to a singular form.

Figure 1:
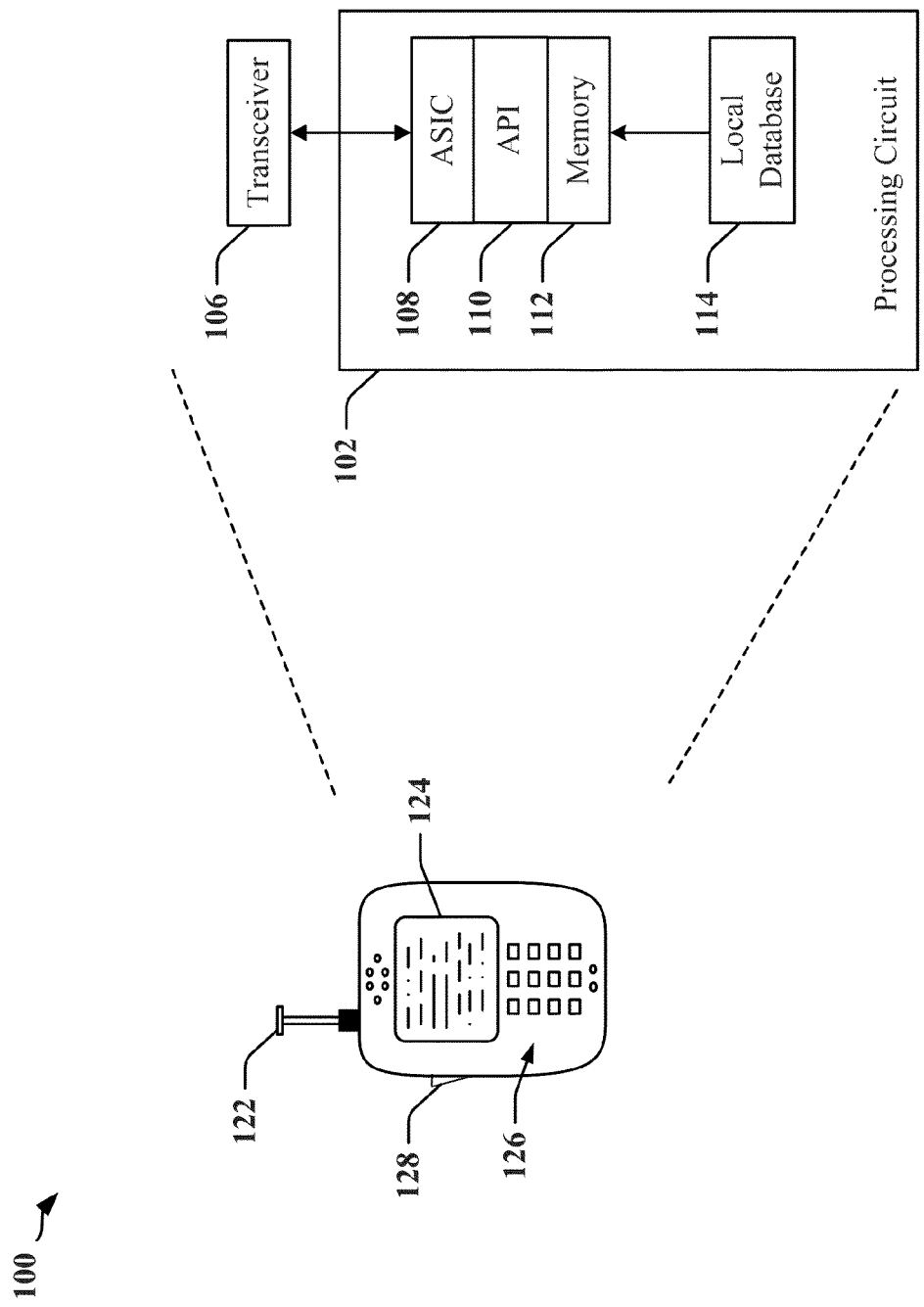
FIG. 1 depicts an apparatus employing a data link between integrated circuit (IC) devices that selectively operates according to one of plurality of available standards.

Certain aspects of the invention may be applicable to communications links deployed between electronic devices that may include subcomponents of an apparatus such as a telephone, a mobile computing device, an appliance, automobile electronics, avionics systems, etc. FIG. 1 depicts an apparatus that may employ a communication link between IC devices. In one example, the apparatus 100 may include a wireless communication device that communicates through a radio frequency (RE) transceiver with a radio access network (RAN), a core access network, the Internet and/or another network. The apparatus 100 may include a communications transceiver 106 operably coupled to processing circuit 102. The processing circuit 102 may comprise one or more IC devices, such as an application specific integrated circuit (ASIC) 108. The ASIC 108 may include one or more processing devices, logic circuits, and so on. The processing circuit 102 may include and/or be coupled to processor readable storage such as a memory 112 that may maintain instructions and data that may be executed by processing circuit 102. The processing circuit 102 may be controlled by one or more of an operating system and an application programming interface (API) 110 layer that supports and enables execution of software modules residing in storage media, such as the memory device 112 of the wireless device. The memory device 112 may include read only memory (ROM) or random access memory (RAM), electrically erasable programmable ROM (EEPROM), flash cards, or any memory device that can be used in processing systems and computing platforms. The processing circuit 102 may include or access a local database 114 that can maintain operational parameters and other information used to configure and operate the apparatus 100. The local database 114 may be implemented using one or more of a database module, flash memory, magnetic media, EEPROM, optical media, tape, soft or hard disk, or the like. The processing circuit may also be operably coupled to external devices such as an antenna 122, a display 124, operator controls, such as button 128 and keypad 126 among other components.

Figure 2:
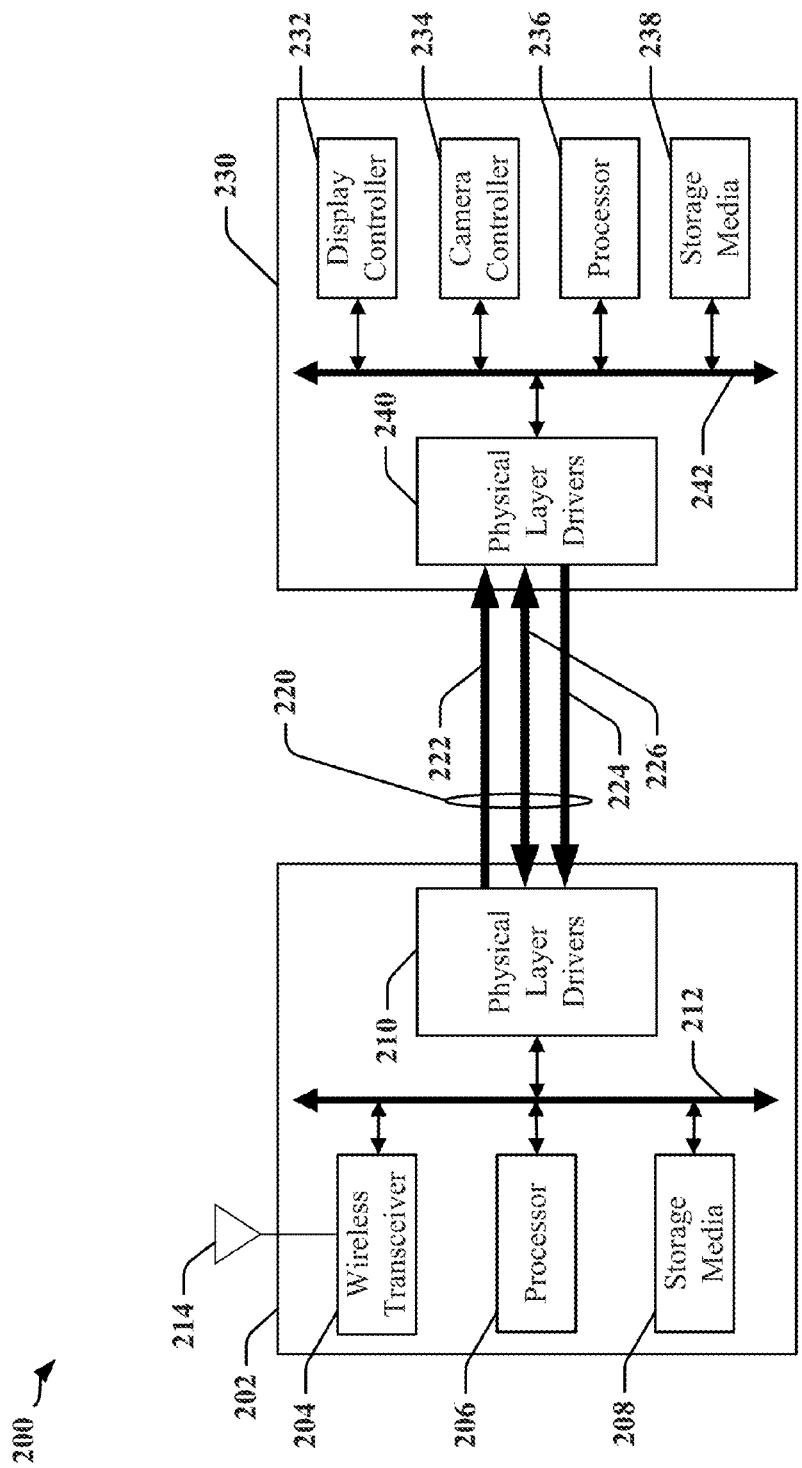
FIG. 2 illustrates a system architecture for an apparatus employing a data link between IC devices.

FIG. 2 is a block schematic illustrating certain aspects of an apparatus 200 connected to a communications bus, where the apparatus 200 may be embodied in one or more of a wireless mobile device, a mobile telephone, a mobile computing system, a wireless telephone, a notebook computer, a tablet computing device, a media player, s gaming device, or the like. The apparatus 200 may comprise a plurality of IC devices 202 and 230 that exchange data and control information through a communication link 220. The communication link 220 may be used to connect IC devices 202 and 230 that are located in close proximity to one another, or physically located in different parts of the apparatus 200. In one example, the communication link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. In another example, a portion of the communication link 220 may comprise a cable or optical connection.

The communication link 220 may include multiple channels 222, 224 and 226. One or more channels 226 may be bidirectional, and may operate in half-duplex and/or full-duplex modes. One or more channels 222 and 224 may be unidirectional. The communication link 220 may be asymmetrical, providing higher bandwidth in one direction. In one example described herein, a first communications channel 222 may be referred to as a forward link 222 while a second communications channel 224 may be referred to as a reverse link 224. The first IC device 202 may be designated as a host system or transmitter, while the second IC device 230 may be designated as a client system or receiver, even if both IC devices 202 and 230 are configured to transmit and receive on the communications link 222. In one example, the forward link 222 may operate at a higher data rate when communicating data from a first IC device 202 to a second IC device 230, while the reverse link 224 may operate at a lower data rate when communicating data from the second IC device 230 to the first IC device 202.

The IC devices 202 and 230 may each have a processor or other processing and/or computing circuit or device 206, 236. In one example, the first IC device 202 may perform core functions of the apparatus 200, including maintaining wireless communications through a wireless transceiver 204 and an antenna 214, while the second IC device 230 may support a user interface that manages or operates a display controller 232. The first IC device 202 or second IC device 230 may control operations of a camera or video input device using a camera controller 234. Other features supported by one or more of the IC devices 202 and 230 may include a keyboard, a voice-recognition component, and other input or output devices. The display controller 232 may include circuits and software drivers that support displays such as a liquid crystal display (LCD) panel, touchscreen display, indicators and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more bus 212 and 242, respectively.

The reverse link 224 may be operated in the same manner as the forward link 222, and the forward link 222 and reverse link 224 may be capable of transmitting at comparable speeds or at different speeds, where speed may be expressed as data transfer rate and/or clocking rates. The forward and reverse data rates may be substantially the same or differ by orders of magnitude, depending on the application. In some applications, a single bidirectional link 226 may support communications between the first IC device 202 and the second IC device 230. The forward link 222 and/or reverse link 224 may be configurable to operate in a bidirectional mode when, for example, the forward and reverse links 222 and 224 share the same physical connections and operate in a half-duplex manner. In one example, the communication link 220 may be operated to communicate control, command and other information between the first IC device 202 and the second IC device 230 in accordance with an industry or other standard.

In one example, forward and reverse links 222 and 224 may be configured or adapted to support a wide video graphics array (WVA) 80 frames per second LCD driver IC without a frame buffer, delivering pixel data at 810 Mbps for display refresh. In another example, forward and reverse links 222 and 224 may be configured or adapted to enable communications between with dynamic random access memory (DRAM), such as double data rate synchronous dynamic random access memory (SDRAM). Encoding devices 210 and/or 240 can encode multiple hits per clock transition, and multiple sets of wires can be used to transmit and receive data from the SDRAM, control signals, address signals, and so on.

The forward and reverse links 222 and 224 may comply or be compatible with application-specific industry standards. In one example, the MIPI standard defines physical layer interfaces between an application processor IC device 202 and an IC device 230 that supports the camera or display in a mobile device. The MIPI standard includes specifications that govern the operational characteristics of products that comply with MIPI specifications for mobile devices. The MIPI standard may define interfaces that employ complimentary metal-oxide-semiconductor (CMOS) parallel busses.

In one example, the communication link 220 of FIG. 2 may be implemented as a wired bus that includes a plurality of signal wires (denoted as N wires). The N wires may be configured to carry data encoded in symbols, where clock information is embedded in a sequence of the symbols transmitted over the plurality of wires.

Figure 3:
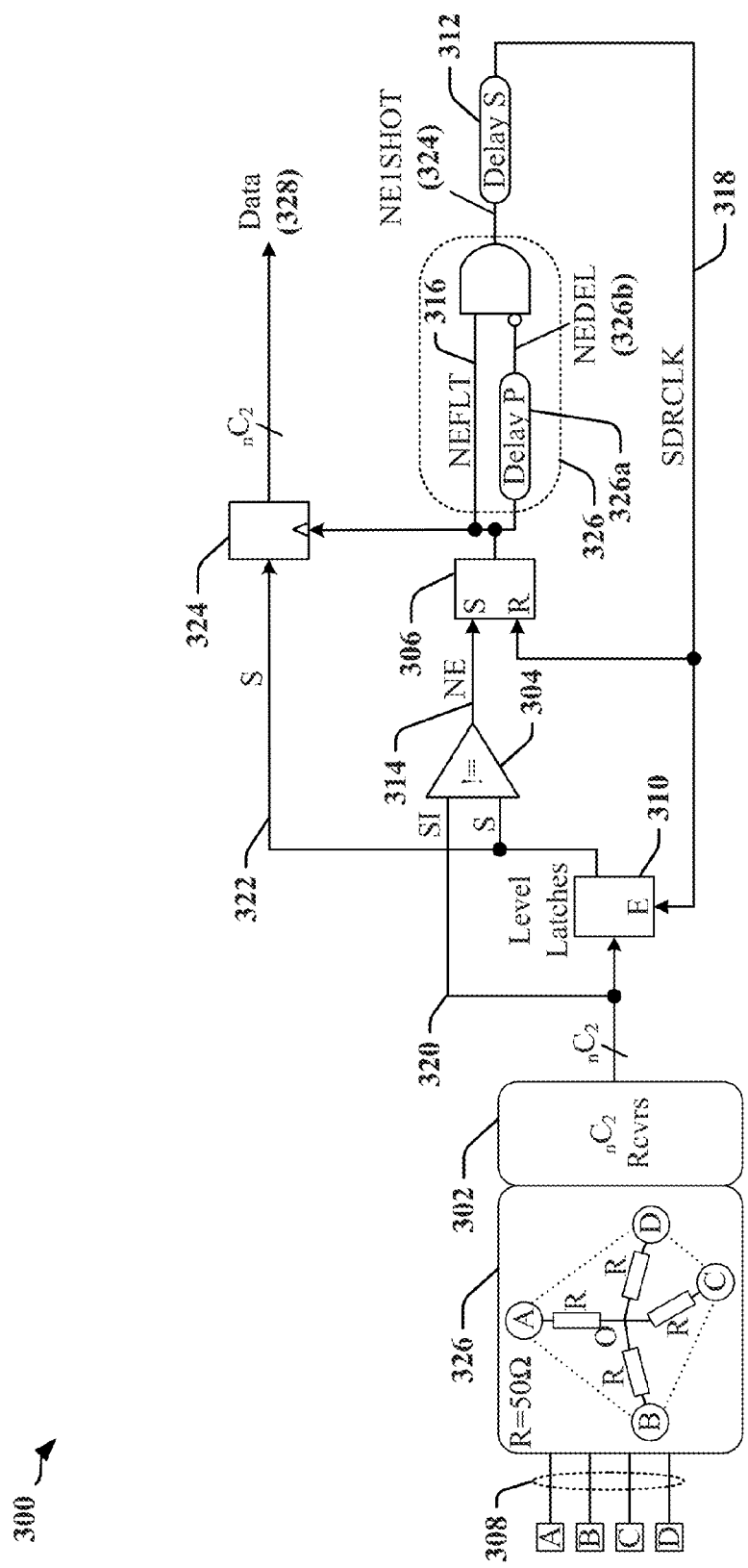
FIG. 3 illustrates a CDR circuit that may be used in an N! communication interface.
Figure 4:
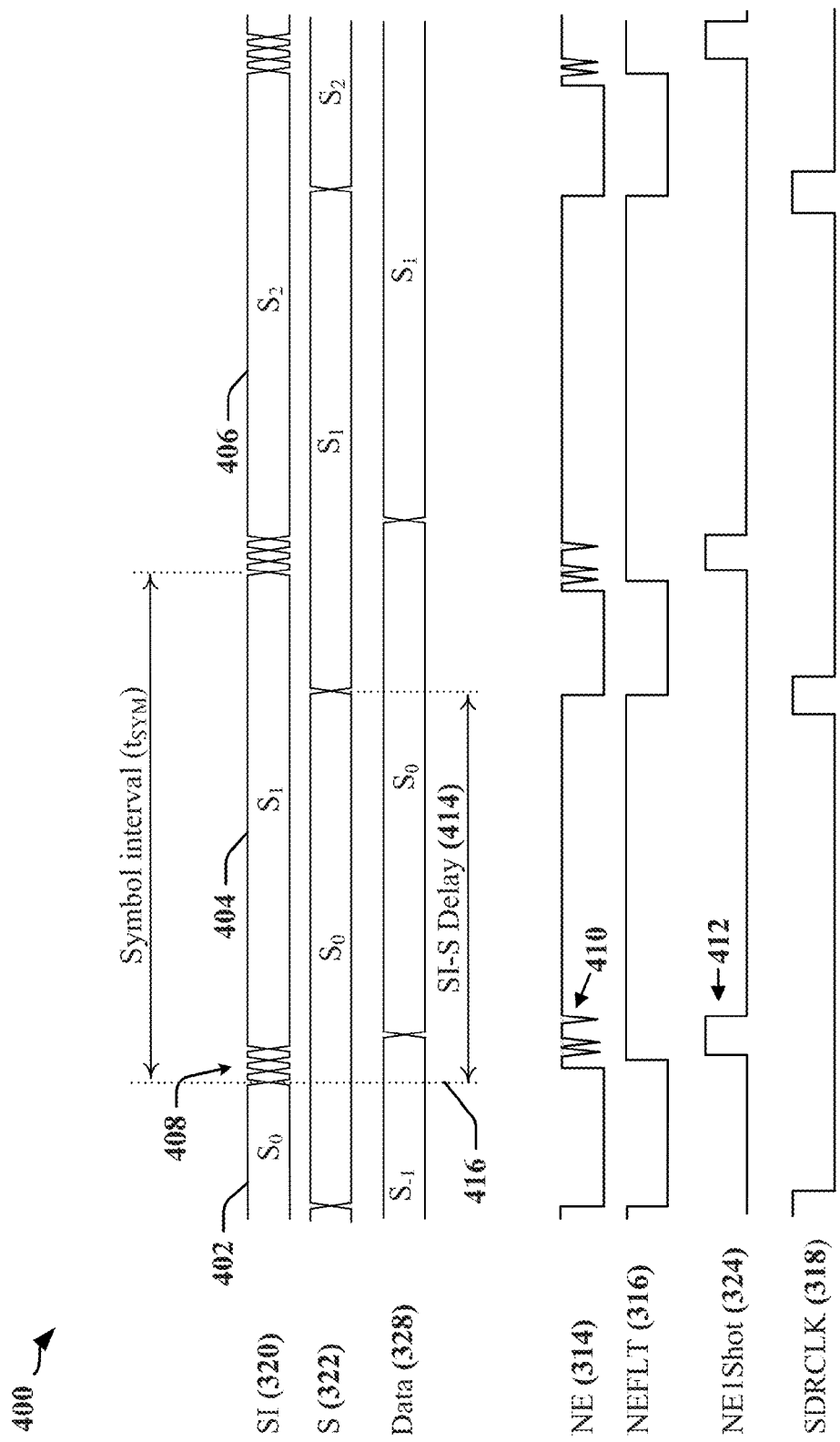
FIG. 4 illustrates timing of certain signals generated by the CDR circuit of FIG. 3 in accordance with one or more aspects disclosed herein.

FIG. 3 illustrates an example of a clock and data recovery (CDR) circuit 300 that may be employed to recover embedded clock information in an N-wire system. FIG. 4 is a timing diagram 400 illustrating certain signals generated through the operation of the CDR circuit 300. The CDR circuit 300 and its timing diagram 400 are provided by way of generalized example, although other variants of the CDR circuit 300 and/or other CDR circuits may be used in some instances. Signals received from N-wires 308 are initially processed by a number ($_NC_2$) of receivers 302, which produce a corresponding number of raw signals as outputs. In the illustrated example, N=4 wires 308 are processed by $_4C_2=6$ receivers 302 that produce a first state transition signal (SI signal) 320 that includes 6 raw signals representative of the received symbol. For each raw signal output from each different receiver there may be a setup time 408 provided between symbols $S_0$ 402, $S_1$ 404 and $S_2$ 406 during which the state of the corresponding signal is undefined, indeterminate, transient or otherwise unstable. Level latches 310, a comparator 304, set-reset latch 306, a one-shot circuit 326, an analog delay element 312 and (bused) level latches 310 may be configured to generate a level-latched signal (S signal) 322 representative of a delayed instance of the SI signal 320, where the delay before the SI signal 320 is captured by the level latches 310 to provide an updated S signal 322 may be selected by configuring a delay element (Delay S) 312.

In operation, the comparator 304 compares the SI signal 320 with the S signal 322 and outputs a binary comparison signal (NE signal) 314. The set-reset latch 306 may receive the NE signal 314 from the comparator 304 and output a signal (NEFLT signal) 316, which is a filtered version of the NE signal 314. The operation of the set-reset latch 306 can be configured to remove any transient instability in the NE signal 314, where the transient instability is exhibited as spikes 410 in the NE signal 314. The NEFLT signal 316 can be used to control the output latches 324 that capture the S signal 322 as output data signal 328.

The one-shot circuit 326 receives the NEFLT signal 316 and produces a fixed width pulse 412, which may then be delayed by the delay element 312 to produce a clock signal (SDRCLK) 318. In some instances, the SDRCLK signal 318 may be used by external circuitry to sample the data output 328 of the CDR 300. In one example, the SDRCLK signal 318 may be provided to decoder or deserializer circuits. The level latches 310 receive the SI signal 320 and output the S signal 322, where the level latches 310 are triggered or otherwise controlled by the SDRCLK signal 318.

In operation, the comparator 304 compares the SI signal 320 with the S signal 322, which is output from the level latches 310. The comparator 304 drives the NE signal 314 to a first state (e.g. logic low) when the SI signal 320 and the S signal 322 are equal, and to a second state (e.g. logic high) when the SI signal 320 and the S signal 322 are not equal. The NE signal 314 is in the second state when the SI signal 320 and the S signal 322 are representative of different symbols. Thus, the second state indicates that a transition is occurring.

As can be appreciated from the timing diagram 400, the S signal 322 is essentially a delayed and filtered version of SI signal 320, in which transients or glitches 408 have been removed because of the delay 414 between the SI signal 320 and the S signal 322. Multiple transitions 408 in the SI signal 320 may be reflected as spikes 410 in the NE signal 314, but these spikes 410 are masked from the NEFLT signal 316 through the operation of the set-reset circuit. Moreover, the SDRCLK 318 is resistant to line skew and glitches in the symbol transitions based on the use of the delays 326a, 312 provided in the feedback path to the level-latch 310 and set-reset latch 306, whereby the SDRCLK signal 318 controls the reset function of the set-reset latch 306.

At the commencement 416 of a transition between a first symbol value $S_0$ 402 and a next symbol value $S_1$ 404, the SI signal 320 begins to change state. The state of the SI signal 320 may be different from $S_1$ 404 due to the possibility that intermediate or indeterminate states 408 during the transition between $S_0$ 402 and $S_1$ 404. These intermediate or indeterminate states 408 may be caused, for example, by inter-wire skew, over/under shoot, cross-talk, etc.

The NE, signal 314 becomes high as soon as the comparator 304 detects a difference in values between the SI signal 320 and the S signal 322, and the transition high of the NE signal 314 asynchronously sets the set-reset latch 306 output, driving the NEFLT signal 316 high. The NEFLT signal 316 is maintained in its high state until the set-reset latch 306 is reset by a high state of the SDRCLK signal 318. The SDRCLK signal 318 is a delayed version of the NEISHOT signal 324, which is a limited pulse-width version of the NEFLT signal 316. The SDRCLK signal 318 may be delayed with respect to the NEISHOT signal 324 through the use of the analog delay circuit 312, for example.

The intermediate or indeterminate states 408 on SI 320 may represent invalid data. These intermediate or indeterminate states 408 may contain a short period of the previous symbol value $S_0$ 402, and may cause the NE signal 314 to return low for short periods of time. Transitions of the SI signal 320 may generate spikes 410 on the NE signal 314. The spikes 410 are effectively filtered out and do not appear in the NEFLT signal 316.

The high state of the NEFLT signal 316 causes the SDRCLK signal 318 to transition high after a delay period 340 caused by the delay circuit 312. The high state of SDRCLK signal 318 resets the set-reset latch 306 output, causing the NEFLT signal 316 to transition to a low state. The high state of the SDRCLK signal 318 also enables the level latches 310, and the SI signal 320 value may be output on the S signal 322.

The comparator 304 detects that the S signal 322 (for symbol $S_1$ 402) matches the symbol $S_1$ 402 value present on the SI signal 320 and switches its output (the NE signal 314) low. The low state of the NEFLT signal 316 causes the SDRCLK signal 318 to go low after a delay period 342 caused by the analog delay 312. This cycle repeats for each transition in the SI signal 320. At a time after the falling edge of the SDRCLK signal 318, a new symbol $S_2$ 406 may be received and may cause the SI signal 320 to switch its value in accordance with the next symbol $S_2$ 406.

Figure 5:
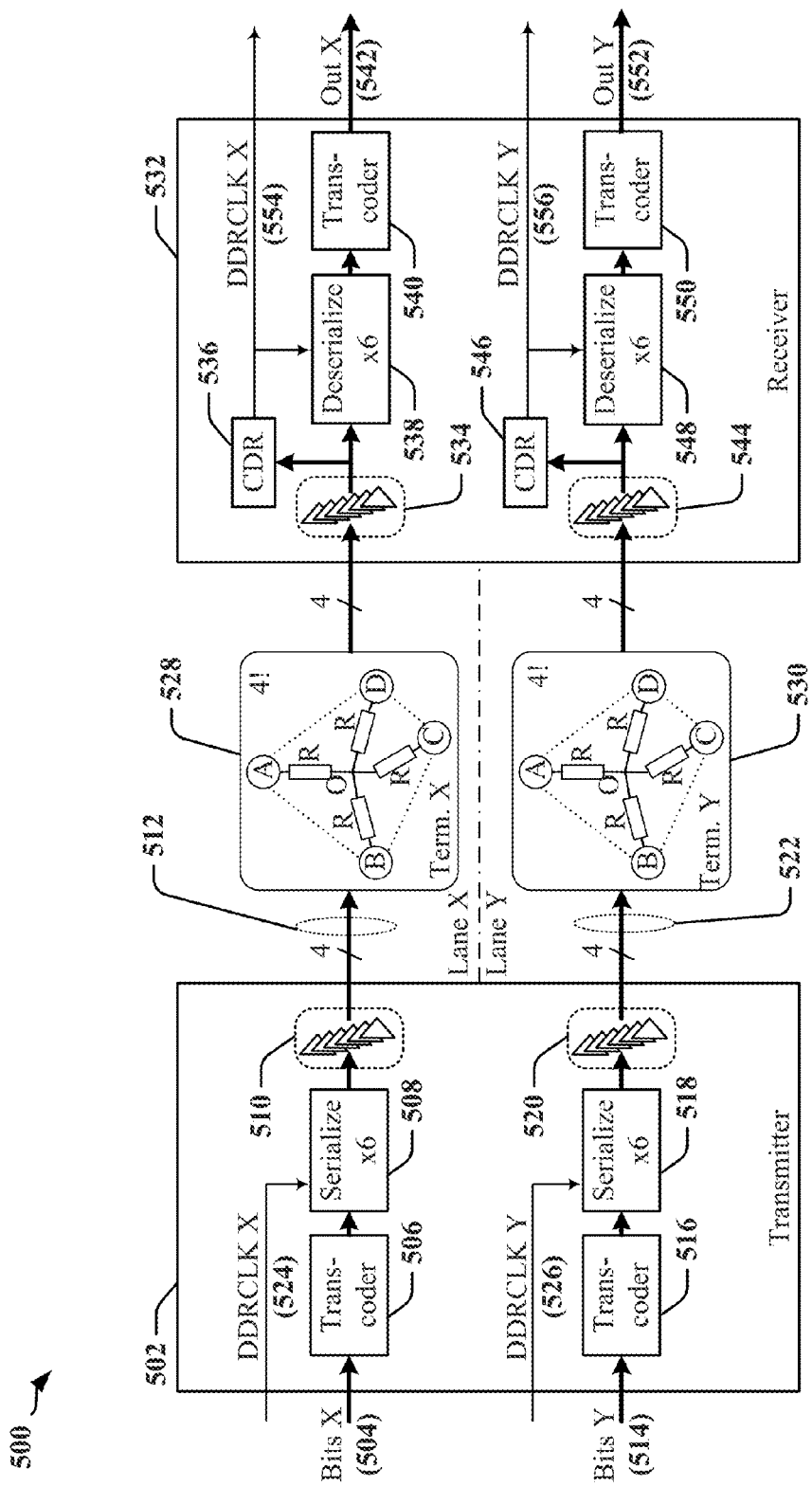
FIG. 5 illustrates an example of a basic N! multi-lane interface.

FIG. 5 is a diagram illustrating one example of a multi-lane interface 500 provided between two devices 502 and 532. At a transmitter 502, transcoders 506, 516 may be used to encode data 504, 514 and clock information in symbols to be transmitted over a set of N wires on each lane 512, 522, using N-factorial (N!) encoding for example. The clock information is derived from respective transmit clocks 524, 526 and may be encoded in a sequence of symbols transmitted in $_NC_2$ differential signals over the N wires by ensuring that a signaling state transition occurs on at least one of the $_NC_2$ signals between consecutive symbols. When N! encoding is used to drive the N wires, each bit of a symbol is transmitted as a differential signal by one of a set of line drivers 510, 520, where the differential drivers in the set of line drivers 510, 520 are coupled to different pairs of the N wires. The number of available combinations of wire pairs and signals may be calculated to be $_NC_2$, and the number of available combinations determines the number of signals that can be transmitted over the N wires. The number of data bits 504, 514 that can be encoded in a symbol may be calculated based on the number of available signaling states available for each symbol transmission interval.

A termination impedance (typically resistive) couples each of the N wires to a common center point in a termination network 528, 530. It will be appreciated that the signaling states of the N wires reflects a combination of the currents in the termination network 528, 530 attributed to the differential drivers 510, 520 coupled to each wire. It will be further appreciated that the center point of the termination network 528, 530 is a null point, whereby the currents in the termination network 528, 530 cancel each other at the center point.

The N! encoding scheme need not use a separate clock channel and/or non-return-to-zero decoding because at least one of the $_NC_2$ signals in the link transitions between consecutive symbols. Effectively, each transcoder 506, 516 ensures that a transition occurs between each pair of symbols transmitted on the N wires by producing a sequence of symbols in which each symbol is different from its immediate predecessor symbol. In the example depicted in FIG. 5, each lane 512, 522 has N=4 wires and each set of 4 wires can carry $_4C_2$=6 differential signals. The transcoder 506, 516 may employ a mapping scheme to generate raw symbols for transmission on the N wires available on a lane 512, 522. The transcoder 506, 516 and serializer 508, 518 cooperate to produce raw symbols for transmission based on the input data bits 504, 514. At the receiver 532, a transcoder 540, 550 may employ a mapping to determine a transition number that characterizes a difference between a pair of consecutive raw symbols, symbols in a lookup table, for example. The transcoders 506, 516, 540, 550 operate on the basis that every consecutive pair of raw symbols includes two different symbols.

The transcoder 506, 516 at the transmitter 502 may select between the N!−1 states that are available at every symbol transition. In one example, a 4! system provides 4!−1=23 signaling states for the next symbol to be transmitted at each symbol transition. The bit rate may be calculated as $\log_2$(available_states) per cycle of the transmit clock 524, 526. In a system using double data rate (DDR) clocking, symbol transitions occur at both the rising edge and falling edge of the transmit clock 524, 526. In one example, two or more symbols can be transmitted per word (i.e. per transmit clock cycle), such that the total available states in the transmit clock cycle is $(_NC_2-1)^2=(23)^2=529$ and the number of data bits 504 that can transmitted per symbol may be calculated as $\log_2(529)=9.047$ bits.

A receiving device 532 receives the sequence of symbols using a set of line receivers 534, 544, where each receiver in the set of line receivers 534, 544 determines differences in signaling states on one pair of the N wires. Accordingly, $_NC_2$ receivers are used in each lane 512, 522, where N represents the number of wires in the corresponding lane 512, 522. The $_NC_2$ receivers 534, 544 produce a corresponding number of raw symbols as outputs.

In the depicted example, each lane 512, 522 has N=4 wires and the signals received on the four wires of each lane 512, 522 are processed by a corresponding set of line receivers 534 or 544 that includes 6 receivers ($_4C_2$=6) to produce a state transition signal that is provided to a corresponding CDR 536, 546 and deserializer 538, 548. The CDRs 536 and 546 may operate in generally the same manner as the CDR 300 of FIG. 3 and each CDR 536 and 546 may produce a receive clock signal 554, 556 that can be used by a corresponding deserializer 538, 548. The clock signal 554 may include a DDR clock signal that can be used by external circuitry to receive data provided by the transcoders 540, 550. Each transcoder 540, 550 decodes a block of received symbols from the corresponding deserializer 538, 548 by comparing each next symbol to its immediate predecessor. The transcoders 540, 550 produce output data 542 and 552 that corresponds to the data 504, 514 provided to the transmitter 502.

As illustrated in the example of FIG. 5, each lane 512, 522 may be operated independently, although in a typical application the data 504 transmitted over one lane 512 may be synchronized with the data 514 transmitted over another lane 522, in one example, data bits 504 for transmission over a first lane (in this example, Lane X) 512 are received by a first transcoder 506 which generates a set of raw symbols that, when transmitted in a' predetermined sequence, ensure that a transition of signaling state occurs in at least one signal transmitted on the 4 wires of the first lane 512. A serializer 508 produces a sequence of symbol values provided to line drivers 510 that determine the signaling state of the 4 wires of the first lane 512 for each symbol interval. Concurrently, data bits 514 are received by a second transcoder 516 of a second lane (in this example, Lane Y)

522. The second transcoder 516 generates a set of transition numbers that are serialized by a serializer 518 that converts the set of transition numbers to a sequence of symbol values provided to line drivers 520 that determine the signaling state of the 4 wires of the second lane 522 for each symbol interval. The sequence of the raw symbols ensure that a transition of signaling state occurs in at least one signal transmitted on the 4 wires of the second lane 522 between each pair of consecutive symbols.

Figure 6:
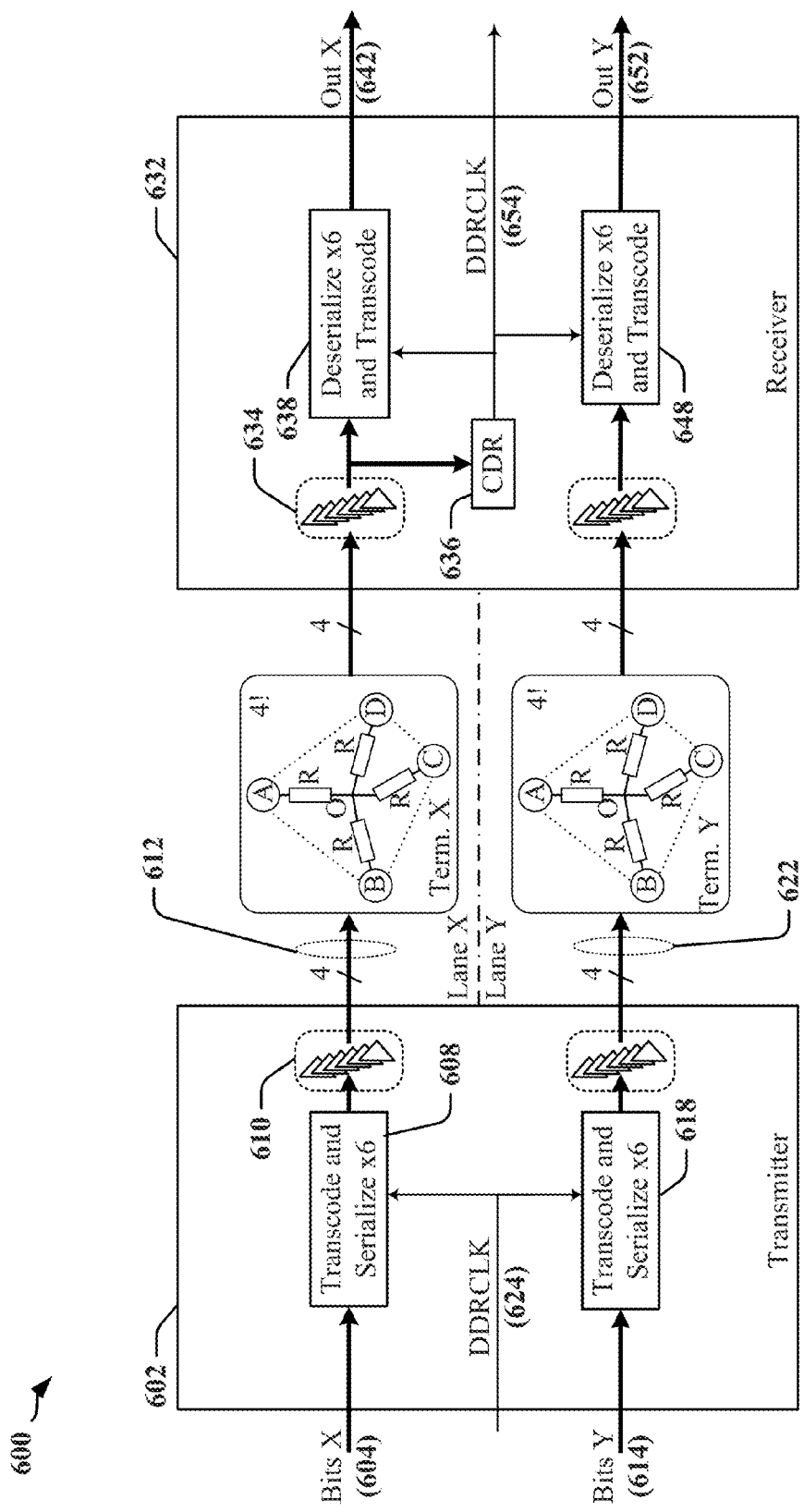
FIG. 6 illustrates a first example of a multi-lane interface provided according to one or more aspects disclosed herein.

FIG. 6 illustrates a first example of a multi-lane interface 600 provided according to certain aspects disclosed herein. The multi-Jane interface 600 offers improved data throughput and reduced circuit complexity when clock information encoded in symbols transmitted on a first lane (here Lane. X) 612 is used to receive symbols transmitted without encoded clock information on one or more other lanes, including Lane Y 622. In the example depicted, each lane 612, 622 includes 4 wires.

Data for transmission may be divided into two portions 604 and 614, where each portion is transmitted on a different lane 612, 622. On a first lane 612, data 604 and information related to the transmit clock 624 may be encoded using the transcoder/serializer 608 to obtain raw symbols that are serialized as described in relation to FIG. 5. At the receiver 632, the output of receivers 634 associated with the first lane 612 is provided to a CDR 636. The CDR 636 may be configured to detect transitions in signaling state in order to generate a receive clock 654 used by both deserializing and transcoding circuits 638 and 648 for both lanes 612, 622. First deserializing and transcoding circuits 638 extract data 642 from the raw symbols received from the first lane 612, while second deserializing and transcoding circuits 648 extract data 652 from the raw symbols received from the second lane 622.

For the second lane 622, transmission data 614 may be provided to transcoding and serializing circuits 618 and transmitted on the second lane 622 without encoded clock information. The transcoding circuitry used to produce raw symbols for the second lane 622 may be significantly less complex than the transcoding circuitry used to produce raw symbols with embedded clock information for transmission on the first lane 612. For example, transcoding circuits for the second lane 622 may not need to perform certain arithmetic operations and logic functions to guarantee state transition at every symbol boundary.

In the example depicted in FIG. 6, a DDR clocked 4-wire first lane 612 provides $(4!-1)^2=(23)^2=529$ signaling states and can encode $\log_2 529=9.047$ bits of data per word received 604, 614, while DDR clocked 4-wire second lane 622 provides $(4!)^2=(24)^2=576$ signaling states and can encode $\log_2 576=9.170$ bits of data per word. In another example, an interface may have two 3-wire lanes where clock information is encoded in the first lane, but not in the second lane. In this latter example, 7 symbols may be transmitted per word and the 3-wire first lane provides $(3!-1)^7=(5)^7=78125$ signaling states and can encode $\log_2 78125=16.253$ bits of data per word, while the 3-wire second lane provides $(3!)^7=6^7=279936$ signaling states and can encode $\log_2 279936=18.095$ bits of data in each clock cycle. By encoding clock information in a single lane of a multi-lane N!, a higher overall throughput can be accomplished with less hardware.

Figure 7:
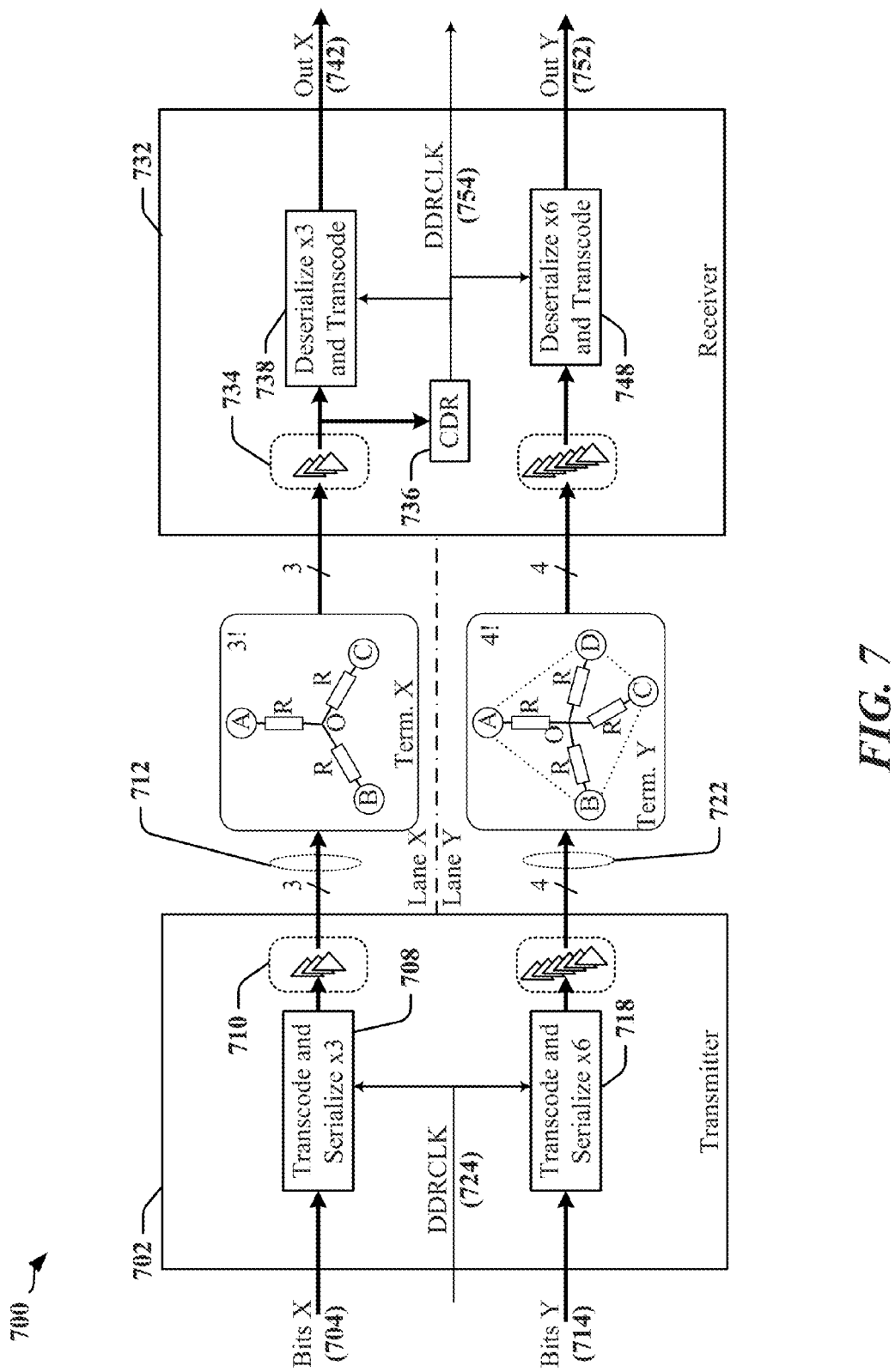
FIG. 7 illustrates a second example of a multi-lane interface provided according to one or more aspects disclosed herein.

FIG. 7 illustrates another example of a multi-lane interface 700 provided in accordance with one or more aspects disclosed herein. The multi-lane interface 700 offers improved flexibility of design in addition to optimized data throughput and reduced circuit complexity. Here clock information encoded in the symbols transmitted on one lane (here Lane X) 712 may be used to receive symbols transmitted on one or more other lanes 722 that have different numbers of wires.

In the depicted example, data for transmission may be divided into a plurality of portions 704 and 714, where each portion is to be transmitted on a different lane 712, 722. On a first lane 712, data 704 and a transmit clock 724 may be converted by transcoding and serializing circuits 708 to obtain a sequence of raw symbols as described in relation to EEGs, 5 and 6. On a second lane 722, the received data 714 may be provided to transcoding and serializing circuits 718 and then transmitted without embedded clock information.

At the receiver 732, the output of receivers 734 associated with the first lane 712 is provided to a CDR 736. The CDR 736 may be configured to detect a transition in signaling state of the 3 wires in the first lane 712, and to generate a receive clock 734 used by both deserializing and transcoding circuits 738 and 748 for both lanes 712, 722. First deserializing and transcoding circuits 738 extract data 742 from the raw symbols received from the first lane 712, while second deserializing and transcoding circuits 748 extract data 752 from the raw symbols received from the second lane 722.

In the example, the first lane 712 includes 3 wires configured for 3! operation, while the second lane 722 includes 4 wires configured for 4! operation. The first lane 712 can provide $(3!-1)^2=(5)^2=25$ signaling states for a 2 symbol per word system, whereby $\log_2 25=4.644$ bits of data can be encoded per word. The 4-wire second lane 722 provides $(4!)^2=(24)^2=576$ signaling states and can encode $\log_2 576=9.170$ bits of data per word.

Significant efficiencies can be obtained when a single lane 712 encodes clock information and variable numbers of wires may be assigned to other lanes 722. In an example where 10 interconnects (wires or connectors) are available between two devices, a conventional 3! system may configure three 3-wire lanes, with clock information encoded on each lane. Each of the three lanes provides 5 signaling states per symbol for a total of 15 states per symbol. However, a system provided according to certain aspects described herein may use the 10 interconnects to provide two 3! lanes and one 4! lane, where the clock information is encoded in a first 3! lane. This combination of lanes provides a total of 5×6×24=720 signaling states per symbol, based on a first 3! lane providing 5 states plus clock information per symbol, a second 3! lane providing 6 states per symbol and a 4! lane providing 24 states per symbol.

Figure 8:
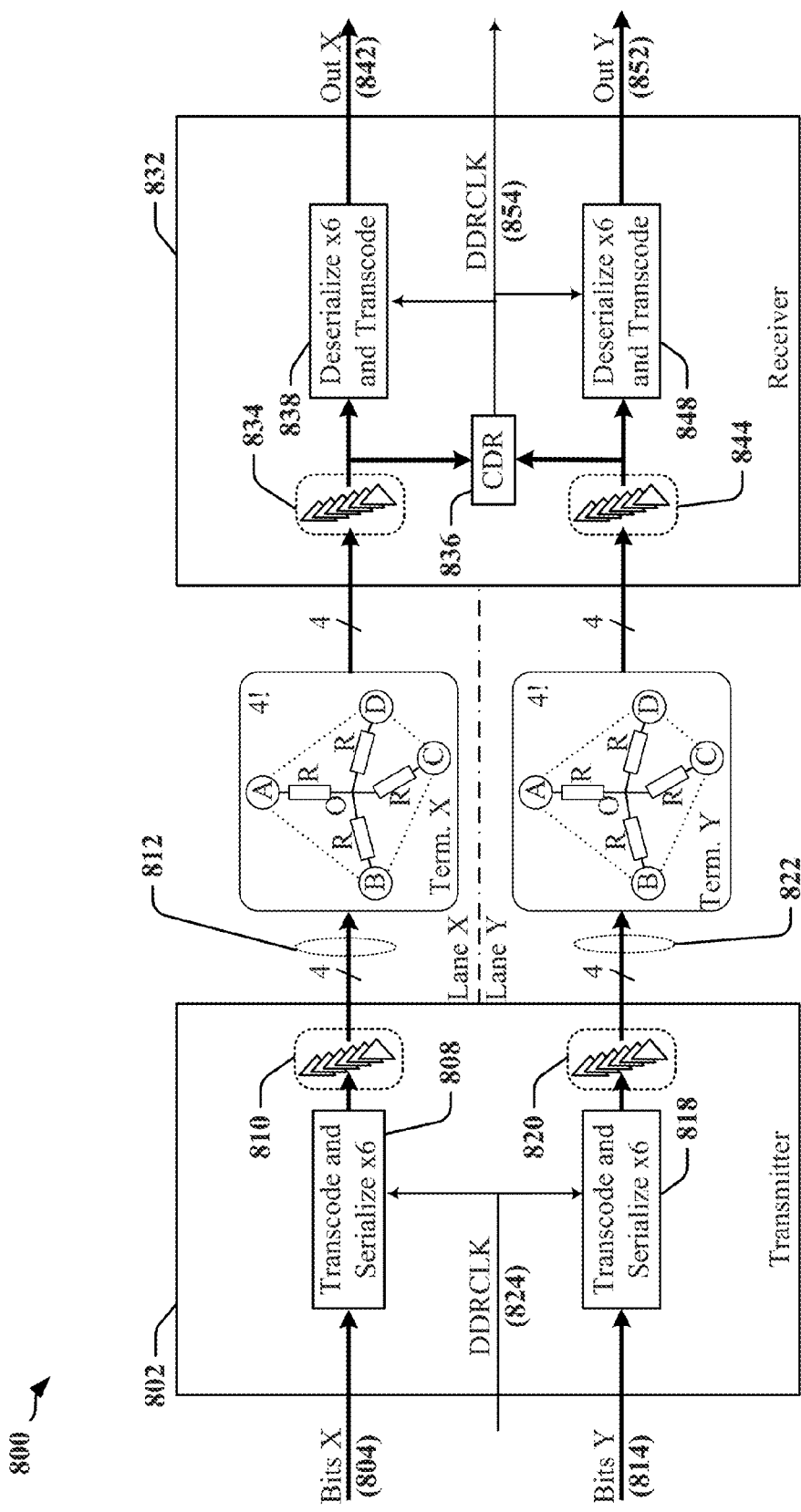
FIG. 8 illustrates a third example of a multi-lane interface provided according to one or more aspects disclosed herein.

FIG. 8 illustrates another example of a multi-Jane interface 800 provided in accordance with one or more aspects disclosed herein. The multi-lane interface 800 offers various benefits including improved decoding reliability, which may permit higher transmission rates. The configuration and operation of the multi-lane interface 800 in this example is similar to that of the multi-lane interface 600 of FIG. 6, except that the CDR 836 is configured to generate a receive clock 854 from transitions detected on either the first lane 812 or the second lane 822. Accordingly, the CDR 836 receives the outputs of the receivers 834 and 844. Variations in the delay between the symbol boundary and an edge of the receive clock 854 may be reduced because the CDR 836 generates a clock from the first detected transition on either lane 812, or 822. This approach can reduce the effect of variable transition times on the wires and/or variable switching times of the line drivers 810, 820 or receivers 834, 844.

In operation, data for transmission may be received in two or more portions 804 and 814, where the portions 804, 814 are for transmission on different lanes 812, 822. A combination of a transcoder and serializer circuits 808 may encode data bits X 804 and embed information related to a transmit clock 824 in a sequence of symbols to be transmitted on the first lane 812, as described in relation to FIG. 5. At the receiver 832, the outputs of both sets of receivers 834 and 844 are provided to the CDR 836, which is configured to detect a transition in signaling state on either lane 812, 822 and generate a receive clock 854 based on the transition. The receive clock 854 is used by both deserializing/transcoding circuits 838 and 848, which produce respective first and second lane data outputs 842 and 852.

Figure 9:
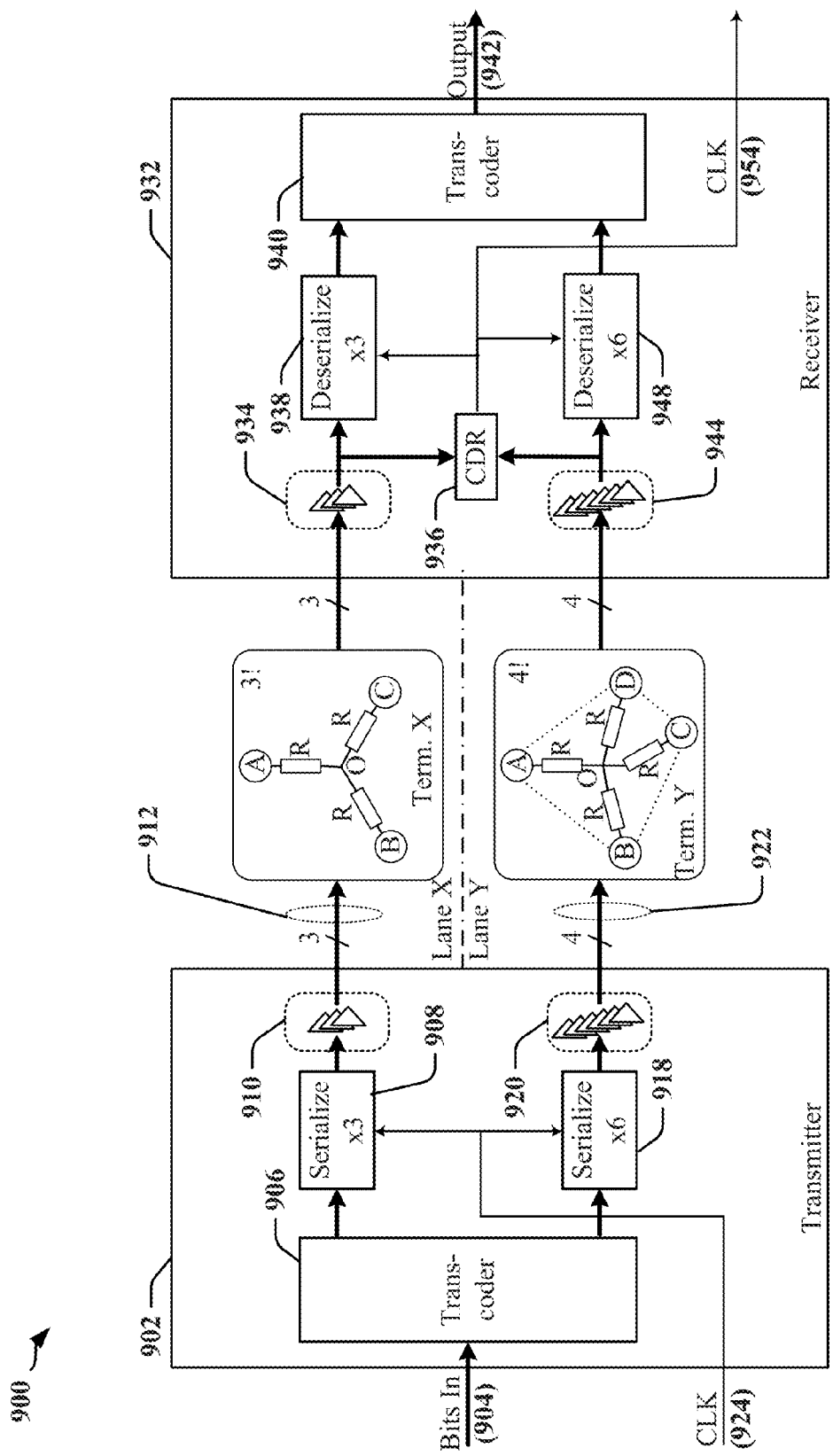
FIG. 9 illustrates a fourth example of a multi-lane interface provided according to one or more aspects disclosed herein.

FIG. 9 illustrates another example of a multi-lane interface 900 provided according to one or more aspects disclosed herein. In this example, the multi-lane interface 900 offers improved data throughput and encoding efficiency by ensuring that a transition in signaling state between consecutive symbol intervals occurs on any one of a plurality of lanes 912, 922. Accordingly, the percentage overhead associated with encoding the clock information can be reduced relative to a system in which the clock information is embedded in sequences of symbols transmitted on a single lane. In the multi-lane interface 900, a first lane (here Lane X) 912 includes three wires that carry 3! encoded signals, while the second lane (here Lane Y) 922 includes four wires and is configured for 4! encoding. Different numbers and configurations of lanes may be employed, and the particular example depicted in FIG. 9 is provided for illustrative purposes only. A transcoder 906 may be adapted to combine data 904 and clock information in symbols to be transmitted over two or more lanes 912 and/or 922.

Encoding efficiencies may be achieved by embedding clock information based on the combination of available signaling states for all lanes 912, 922. The clock information is embedded by ensuring that a transition in signaling state occurs on at least one lane 912, 922 between consecutive symbol intervals. In operation, the transcoder 906 may be configured to produce different sets of symbols for each lane 912, 922. In one example, the data 904 received by a transmitter 902 according to a clock signal 924 may be transmitted as a first sequence of symbols encoded in three signals transmitted on the 3! first lane 912, and a second sequence of symbols encoded in six signals concurrently transmitted on the 4! second lane 922. The transcoder 906 embeds clock information by ensuring that a signaling state transition occurs on at least one of the lanes 912 and 922 between consecutive symbols. The total number of states per symbol interval is the product of the number of states per symbol transmitted on the first lane 912 and the number of states per symbol transmitted on the second lane 922. Accordingly, the number of states available to the transcoder at each symbol interval, when clock information is embedded across both lanes 912, 922 may be calculated as:

$$(N_{lane1}! \times N_{lane2}!) - 1 = (3! \times 4!) - 1 = (6 \times 24) - 1 = 143$$

In another example, the number of states available to the transcoder at each symbol interval, when clock information is embedded across two lanes that are encoded in three signals using 3! may be calculated as:

$$(N_{laneX}! \times N_{laneY}!) - 1 = (3! \times 3!) - 1 = (6 \times 6) - 1 = 35$$

The number of states available to the transcoder at each symbol transition governs the number of bits that can be transmitted in each receive data cycle.

TABLE 1

| Bits sent in 7 symbols | Description |
| --- | --- |
| $\log_2(3! - 1)^7 = 16.2535$ | One lane 3! |
| $\log_2(4! - 1)^7 = 31.6650$ | One lane 4! |
| $\log_2((3! - 1) \times 4!)^7 = 48.3482$ | 3! and 4!, transcoding on 3! |
| $\log_2(3! \times (4! - 1))^7 = 49.7597$ | 3! and 4!, transcoding on 4! |
| $\log_2((3! \times 4!) - 1)^7 = 50.1191$ | Transcoding on combined 3! and 4! |

Table 1 and Table 2 illustrate increased coding efficiencies when clock information is embedded by a transcoder across two or more N! lanes. Table 1 relates to the multilane interface 900 of FIG. 9. As can be seen from the table, a maximum encoding efficiency is obtained when a transcoder 906 embeds the clock information by considering the sequences of symbols transmitted on both lanes 912, 922.

TABLE 2

| Bits sent in 7 symbols | Description |
| --- | --- |
| $\log_2(3! - 1)^7 \times 2 = 32.5070$ | Transcoding on each 3! lanes |
| $\log_2((3! - 1) \times 3!)^7 = 34.3482$ | Transcoding on one 3! lane |
| $\log_2(3! \times 3! - 1)^7 = 36.1895$ | Transcoding on combined 3! lanes |

Table 2 relates to an example of a multilane interface that has two 3! lanes.

In the example of FIG. 9, the receiver 932 includes a CDR 936 that generates a receive clock 954 by detecting transitions on both lanes 912, 922. The deserializers 938, 948 provide symbols received from respective lanes 912, 922 to a transcoder 940 that reverses the transcoding performed by the transcoder 906 in the transmitter. The transcoder 940 in the receiver 932 operates by examining the combined sequences of received symbols to produce output data 942, which corresponds to the data 904 received at the transmitter 902. Sets of line drivers 910, 920 and receivers 934, 944 may be provided according to the number of wires in the N! lanes 912, 922.

Figure 10:
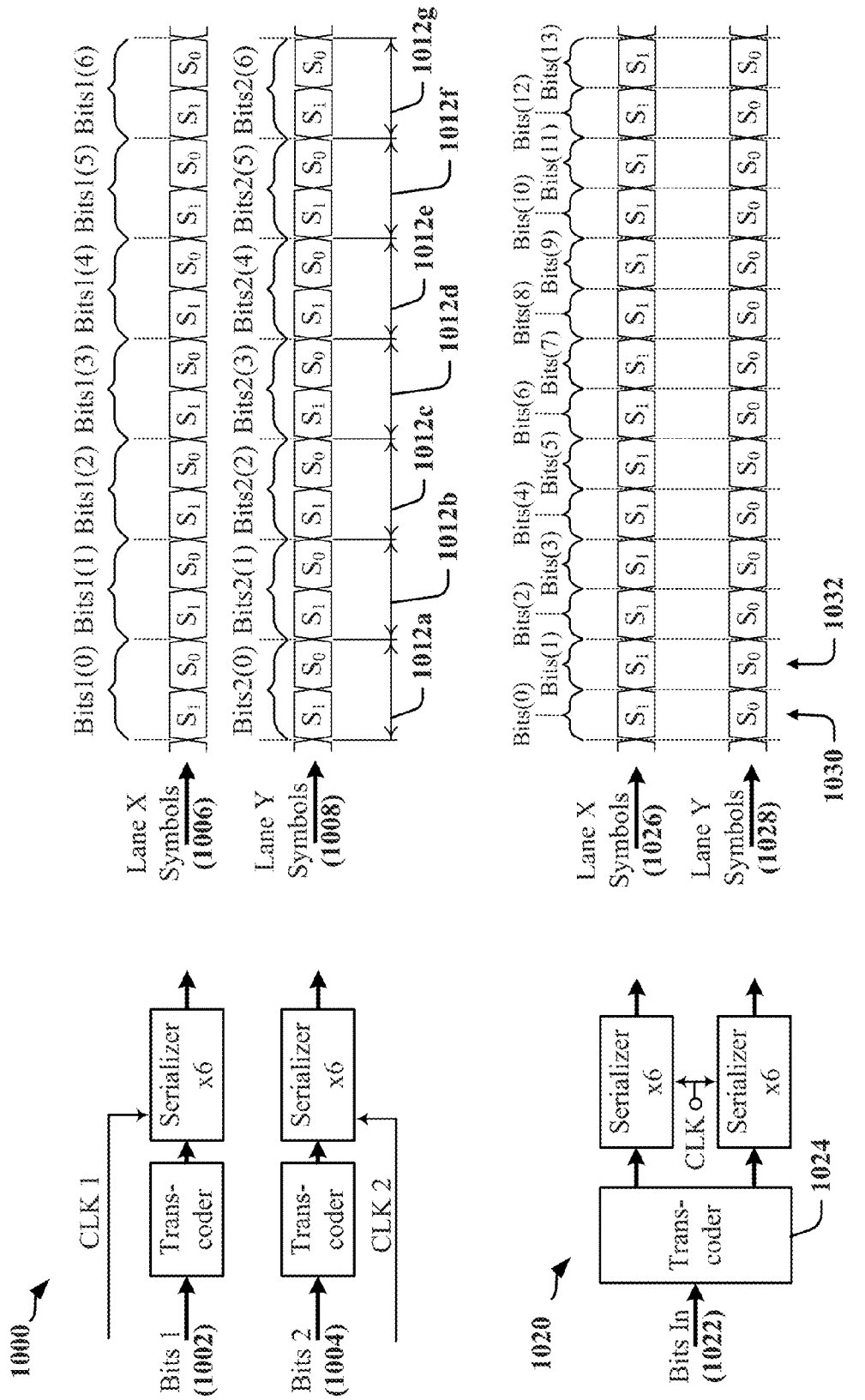
FIG. 10 is a timing diagram illustrating the ordering of data transmitted on a multi-lane interface provided according to one or more aspects disclosed herein.

The multi-lane interface 900 can be configured to provide additional advantages over conventional interfaces. FIG. 10 illustrates an example in which a transcoder 1024 can be used to control the order of delivery of data to a receiver. One multi-lane interface 1000 such as the multi-lane interface 500 in FIG. 5 may independently encode two or more sets of data bits 1002, 1004 in sequences of symbols 1006, 1008 for transmission over a corresponding number of lanes. Data may be provided to the multi-lane interface 1000 pre-divided into the sets of data bits 1002, 1004, and/or the sets of data bits 1002, 1004 may be split by the multi-lane interface 1000. Data bits may be allocated among the two or more sets of data bits 1002, 1004 arbitrarily, according to function, design preference or for convenience and/or other reasons.

In the illustrated multi-lane interface 1000, each word, byte or other data element received in a first clock cycle may be encoded into two or more symbols transmitted sequentially in a pair of symbol intervals 1012a-1012g on one of the two lanes. The receiver can decode the data element when the two or more symbols are received from the pair of symbol intervals 1012a-1012g.

A multi-lane interface 1020, such as the multi-lane interface 900 of FIG. 9, may include a transcoder 1024 that encodes data 1022 and clock information into a plurality of sequences of symbols 1026, 1028 concurrently transmitted over two or more lanes. The transcoder 1024 may control the order of delivery of data to a receiver by concurrently transmitting symbols for transmission on two lanes, in one example, data bits 1022 received in a first clock cycle (Bits(0)) may be transcoded into two symbols and transmitted in parallel on two lanes during a first symbol interval 1030. Data bits 1022 received in a second clock cycle (Bits(1)) may be transmitted as two symbols in parallel on the two lanes during a second symbol interval 1032. Transmission of data on two parallel data lanes may provide certain benefits for timing-sensitive applications such as shutter and/or flash control in a camera, control signals associated with game applications.

Figure 11:
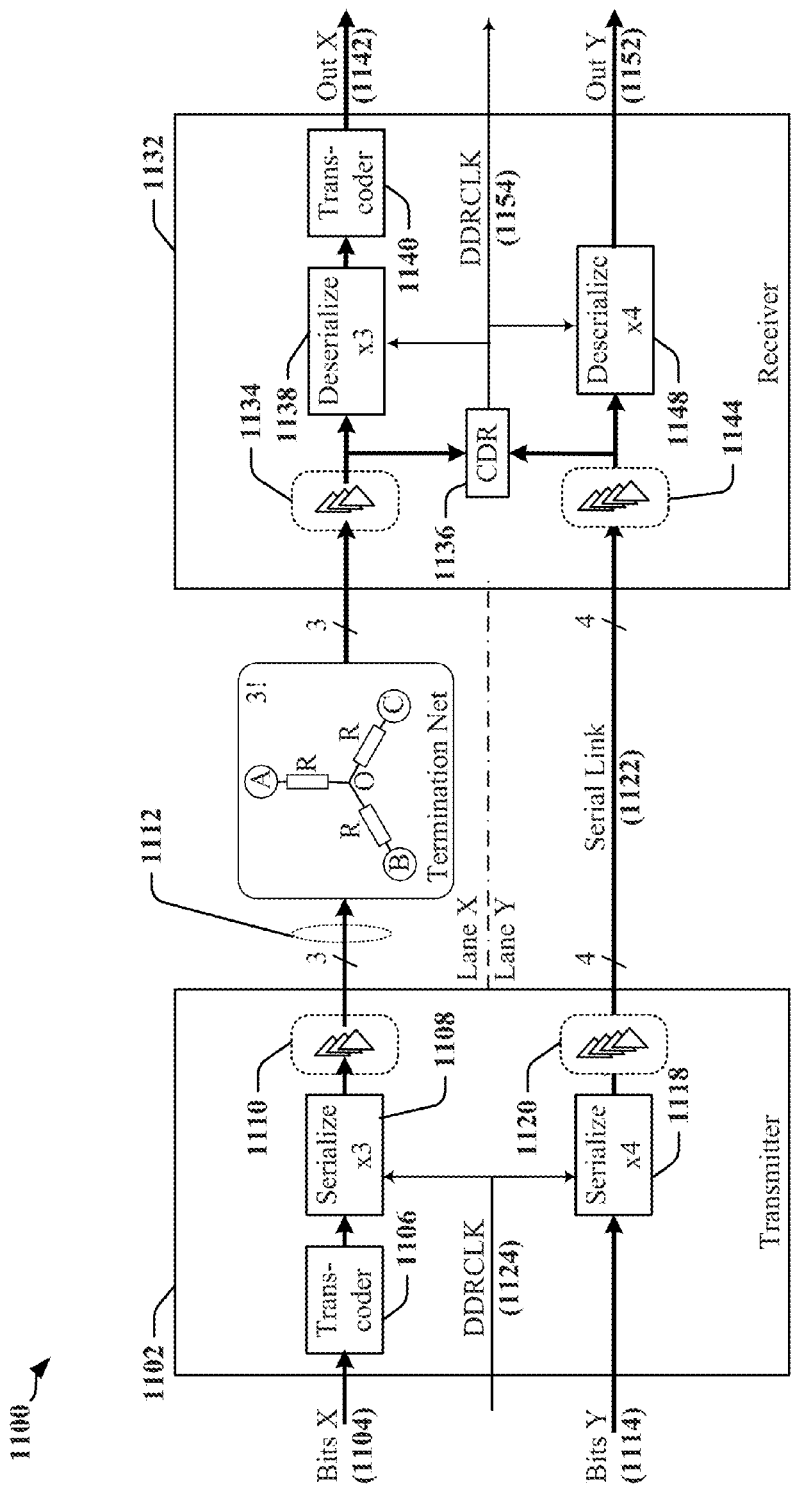
FIG. 11 illustrates a fifth example of a multi-lane interface provided according to one or more aspects disclosed herein.

FIG. 11 illustrates another example of a multi-lane interface 1100 provided in accordance with one or more aspects disclosed herein. In this example, the multi-lane interface 1100 includes at least one N! encoded lane 1112 and a serial data link 1122. The serial data link 1122 may be a single ended serial link (as illustrated) or a differentially encoded serial data link. The serial data link 1122 may include a serial bus, such as an Inter-Integrated Circuit (I2C) bus, a camera control interface (CCI) serial bus or derivatives of these serial bus technologies. In the example depicted, a clock signal 1124 is used by the serializer 1108 of the N! link and the serializer 1118 of the serial link 1122, and the clock signal 1124 need not be transmitted to the receiver 1132 over a separate clock signal lane. Instead, a transcoder 1106 embeds clock information in a sequence of symbols that is provided through the serializer to the differential line drivers of the N! lane 1112.

At the receiver 1132, a CDR 1136 generates a receiver clock signal 1154 from transitions detected at the outputs of receivers 1134. The receiver clock signal 1154 is used by the N! lane deserializer 1138 and the serial link deserializer 1148. In some instances, the CDR 1136 may monitor the output of the line receivers 1144 associated with the serial link 1122 in order to improve detection of a transition between symbol intervals. The N! lane deserializer 1138 provides deserialized symbol information to the transcoder 1140, which produces output data 1142 representative of the input data 1104 that is transmitted over the N! encoded lane 1112.

In one example, a transmitter 1102 transmits symbols in three signals on a 3! encoded first lane 1112. The symbols include embedded clock information and 5 signaling states per symbol are available on the first lane 1112. The transmitter may also send data on a second lane using 4 serial signals transmitted on the wires of a serial link 1122. The receiver 1132 may generate a clock signal 1154 from the symbols transmitted on the first lane 1112, where the clock is used to decode/deserialize data transmitted on both lanes 1112, 1122. Accordingly, the serial link 1122 provides $2^4=16$ states per symbol when the clock 1154 provided by the CDR 1136 is used by the deserializer 1148 for the second lane serial link 1122. An aggregate of 5×16=80 states per symbol is achieved when the clock 1154 provided by the CDR 1136 is used.

By way of comparison, a conventional or traditional four-wire serial link 1122 may dedicate one of the four wires for carrying a clock signal, and data transmission may be limited to three signals on the other three of the 4 wires. In this latter configuration, $2^3=8$ signaling states per symbol may be provided on the serial link 1122, and an aggregate of 5×8=40 signaling states per symbol results when data is also transmitted in the 3! encoded first lane 1112.

Figure 12:
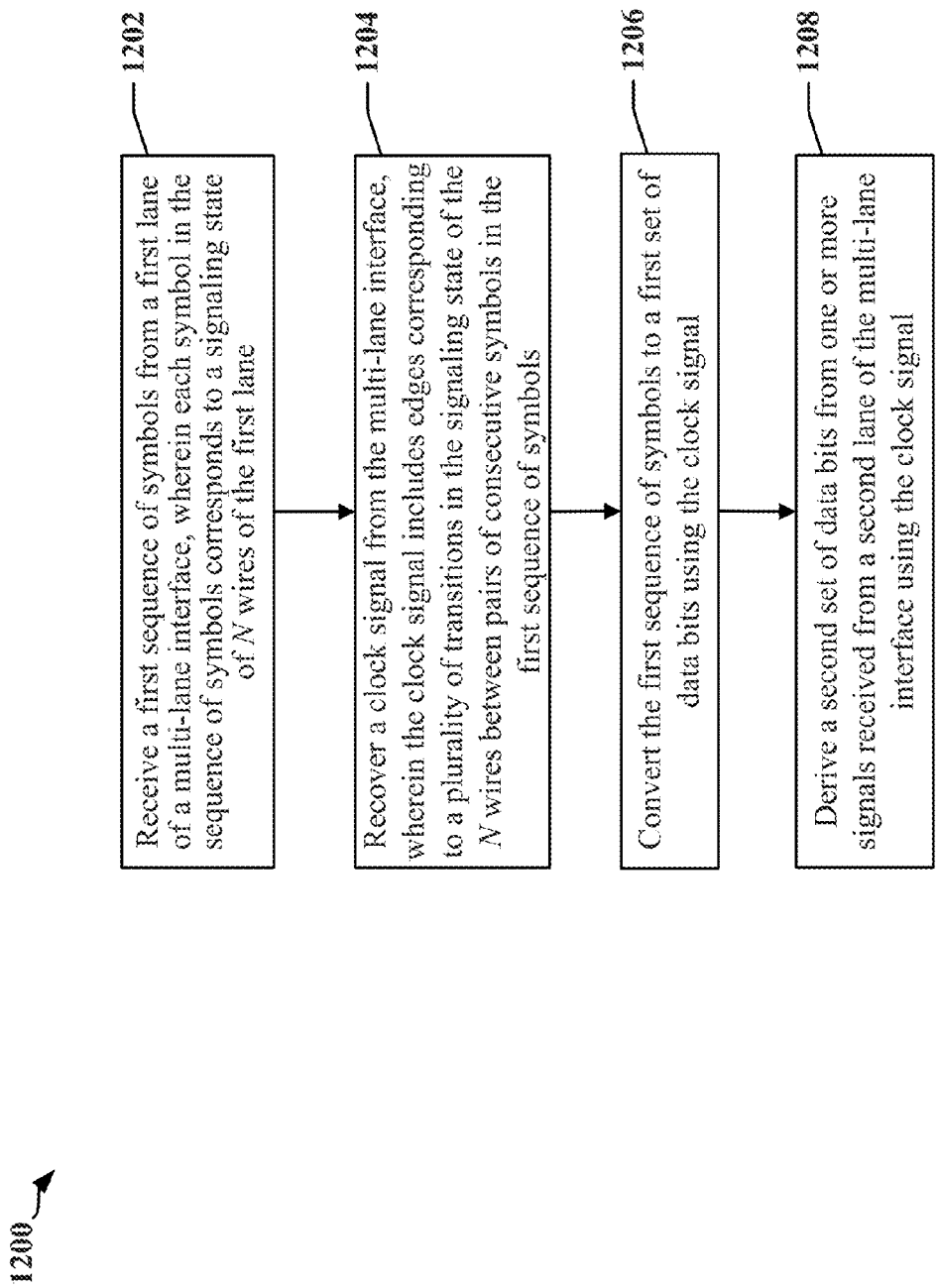
FIG. 12 is a flow chart of a method for operating a receiver in a multi-lane N-wire interface provided according to one or more aspects disclosed herein.

FIG. 12 is a flowchart 1200 illustrating a method for data communications on an N-wire communications link. The communications link may include a plurality of connectors that carry symbols encoded using a suitable encoding scheme, such as N! encoding, multiphase encoding, multi-wire differential encoding, etc. The connectors may include electrically conductive wires, optical signal conductors, semi-conductive interconnects and so on. The method may be performed by one or more processors of a receiving device.

At step 1202, a first sequence of symbols is received from a first lane of a multi-lane interface. Each symbol in the sequence of symbols may correspond to a signaling state of N wires of the first lane.

At step 1204, a clock signal is recovered or extracted from the multi-lane interface. The clock signal may include edges corresponding to a plurality of transitions in the signaling state of the N wires between pairs of consecutive symbols in the first sequence of symbols.

At step 1206, the first sequence of symbols is converted to a first set of data bits using the clock signal. The first sequence of symbols may be converted to the first set of data bits by using a transcoder to convert the first sequence of symbols to a set of transition numbers, and converting the set of transition numbers to obtain the first set of data bits.

At step 1208, a second set of data bits is derived from one or more signals received from a second lane of the multi-lane interface using the clock signal. The second set of data bits may be derived without using a transcoder.

In accordance with certain aspects disclosed herein, the first sequence of symbols may be encoded in $_NC_2$ differential signals received from different pairs of the N wires. The second lane may include M wires, wherein a second sequence of symbols is encoded in $_MC_2$ differential signals received from $_MC_2$ different pairs of the M wires. M and N may have equal or have different values.

In accordance with certain aspects disclosed herein, deriving the second set of data bits includes receiving serial signals from each of Ai wires of a serial interface, and extracting the second set of data bits by sampling the serial signals in accordance with the clock signal. Deriving the second set of data bits may includes receiving M/2 differential signals from M wires of a serial interface, and extracting the second set of data bits by sampling the M/2 differential signals in accordance with the clock signal.

In accordance with certain aspects disclosed herein, the clock signal may be recovered or extracted by providing a transition in the clock signal corresponding to a transition detected in the signaling state of the N wires or in the signaling state of one or more wires of the second lane. The clock signal may include edges corresponding to one or more transitions in the signaling state of at least one wire of the second lane of the multi-lane interface.

In accordance with certain aspects disclosed herein, the first sequence of symbols is encoded in $_NC_2$ differential signals. Each of the $_NC_2$ differential signals may be received from a different pair of the N wires. A second sequence of symbols may be encoded in $_MC_2$ differential signals received from M wires of the second lane. Each of the $_MC_2$ differential signals may be received from a different pair of the M wires. The first sequence of symbols may be converted to the first set of data bits using a transcoder circuit. The second sequence of symbols may be converted to the second set of data hits using the same transcoder circuit.

In accordance with certain aspects disclosed herein, a transition in the signaling state of one or more of the N wires and the M wires occurs between each sequential pair of symbols in the first sequence of symbols. Each of the first sequence of symbols may be transmitted in a different symbol interval. The first set of data bits and the second set of data bits received in each symbol interval may be combined to obtain a completed data element from the each symbol interval.

Figure 13:
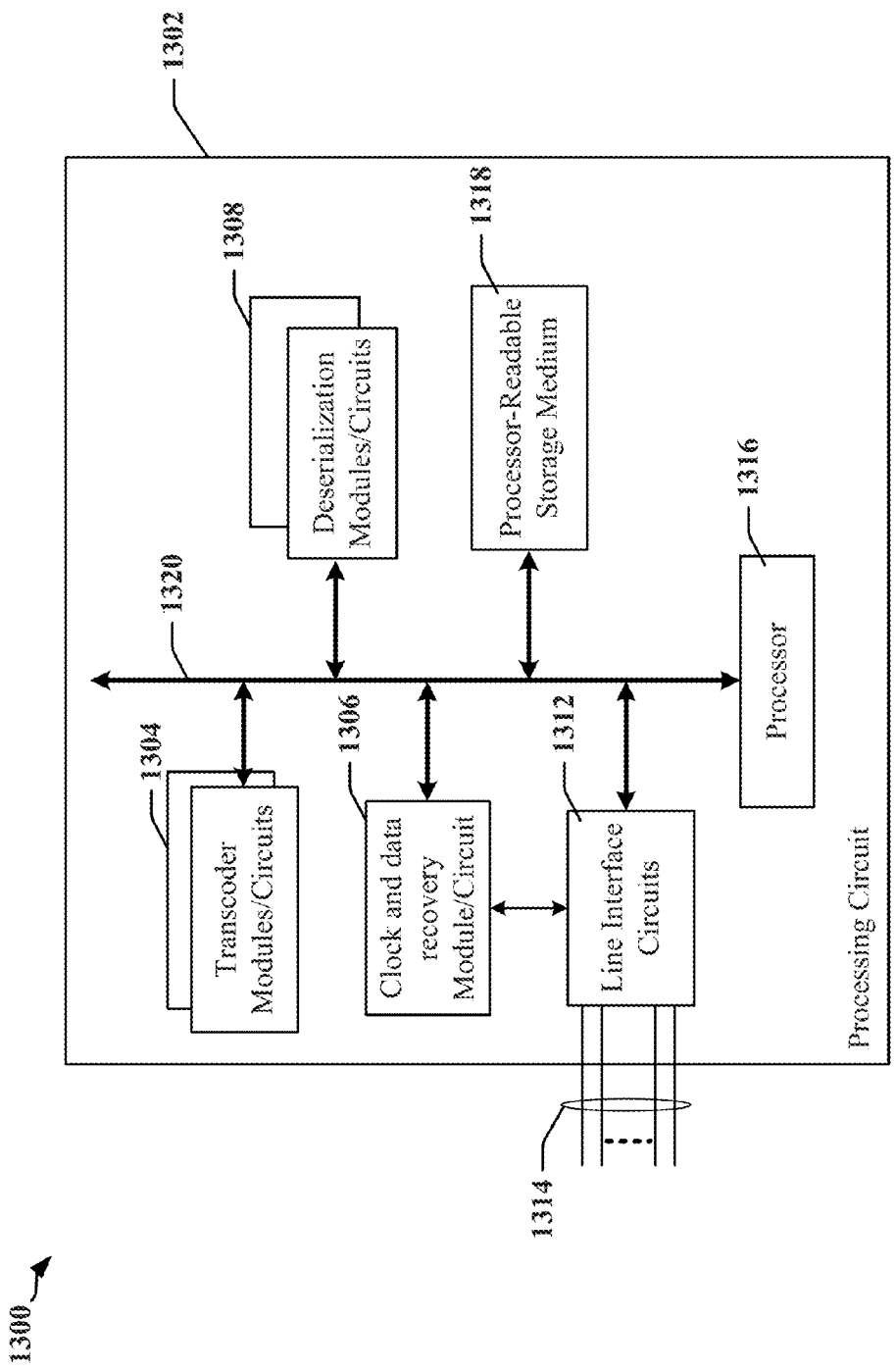
FIG. 13 is a diagram illustrating a simplified example of a receiver in a multi-lane N-wire interface provided according to one or more aspects disclosed herein.

FIG. 13 is a diagram illustrating a simplified example of a hardware implementation for an apparatus 1300 employing a processing circuit 1302. The processing circuit typically has a processor 1316 that may include one or more of a microprocessor, microcontroller, digital signal processor, a sequencer and a state machine. The processing circuit 1302 may be implemented with a bus architecture, represented generally by the bus 1320. The bus 1320 may include any number of interconnecting buses and bridges depending on the specific application of the processing circuit 1302 and the overall design constraints. The bus 1320 links together various circuits including one or more processors and/or hardware modules, represented by the processor 1316, the modules and/or circuits 1304, 1306 and 1308, line interface circuits 1312 configurable to communicate over connectors or wires (multi-lane interface) 1314 and the processor-readable/computer-readable storage medium 1318. The bus 1320 may also link various other circuits such as timing sources, peripherals, voltage regulators, and power management circuits, which are well known in the art, and therefore, will not be described any further.

The processor 1316 is responsible for general processing, including the execution of software stored on the computer-readable storage medium 1318. The software, when executed by the processor 1316, causes the processing circuit 1302 to perform the various functions described supra for any particular apparatus. The computer-readable storage medium 1318 may also be used for storing data that is manipulated by the processor 1316 when executing software, including data decoded from symbols transmitted over the connectors 1314. The processing circuit 1302 further includes at least one of the modules and/or circuits 1304, 1306 and 1308. The modules and/or circuits 1304, 1306 and 1308 may be software modules running in the processor 1316, resident/stored in the computer-readable storage medium 1318, one or more hardware modules coupled to the processor 1316, or some combination thereof. The modules and/or circuits 1304, 1306 and/or 1308 may include microcontroller instructions, state machine configuration parameters, or some combination thereof.

In one configuration, the apparatus 1300 for wireless communication includes modules and/or circuits 1306, 1312 configured to receive a first sequence of symbols from a first lane of a multi-lane interface 1314, a module and/or circuit 1306 configured to recover a clock signal from the multi-lane interface 1314, where the clock signal includes edges corresponding to a plurality of transitions in the signaling state of the N wires occurs between pairs of consecutive symbols in the first sequence of symbols, modules and/or circuits 1304 and/or 1308 configured to convert the first sequence of symbols to a first set of data bits using the clock signal, and modules and/or circuits 1304 and/or 1308 configured to derive a second set of data bits from one or more signals received from a second lane of the multi-lane interface 1314 using the clock signal. In one example, the circuits illustrated in FIGS. 6-9 and 11 provides logic which implement the various functions performed by the processing circuit 1302.

In an aspect of the disclosure, the computer-readable storage medium 1318 has one or more instructions stored or maintained thereon. When executed by at least one processor 1316 of the processing circuit 1302, the instructions may cause the processing circuit 1302 to receive a first sequence of symbols from a first lane of a multi-lane interface 1314, recover a clock signal from the multilane interface 1314, wherein the clock signal includes edges corresponding to a plurality of transitions in the signaling state of the N wires between pairs of consecutive symbols in the first sequence of symbols, convert the first sequence of symbols to a first set of data bits using the clock signal, and derive a second set of data bits from one or more signals received from a second lane of the multilane interface 1314 using the clock signal. Each symbol in the sequence of symbols may correspond to a signaling state of the N wires.

The aforementioned means may be implemented, for example, using some combination of a processor 206 or 236, physical layer drivers 210 or 240 and storage media 208 and 238.

Figure 14:
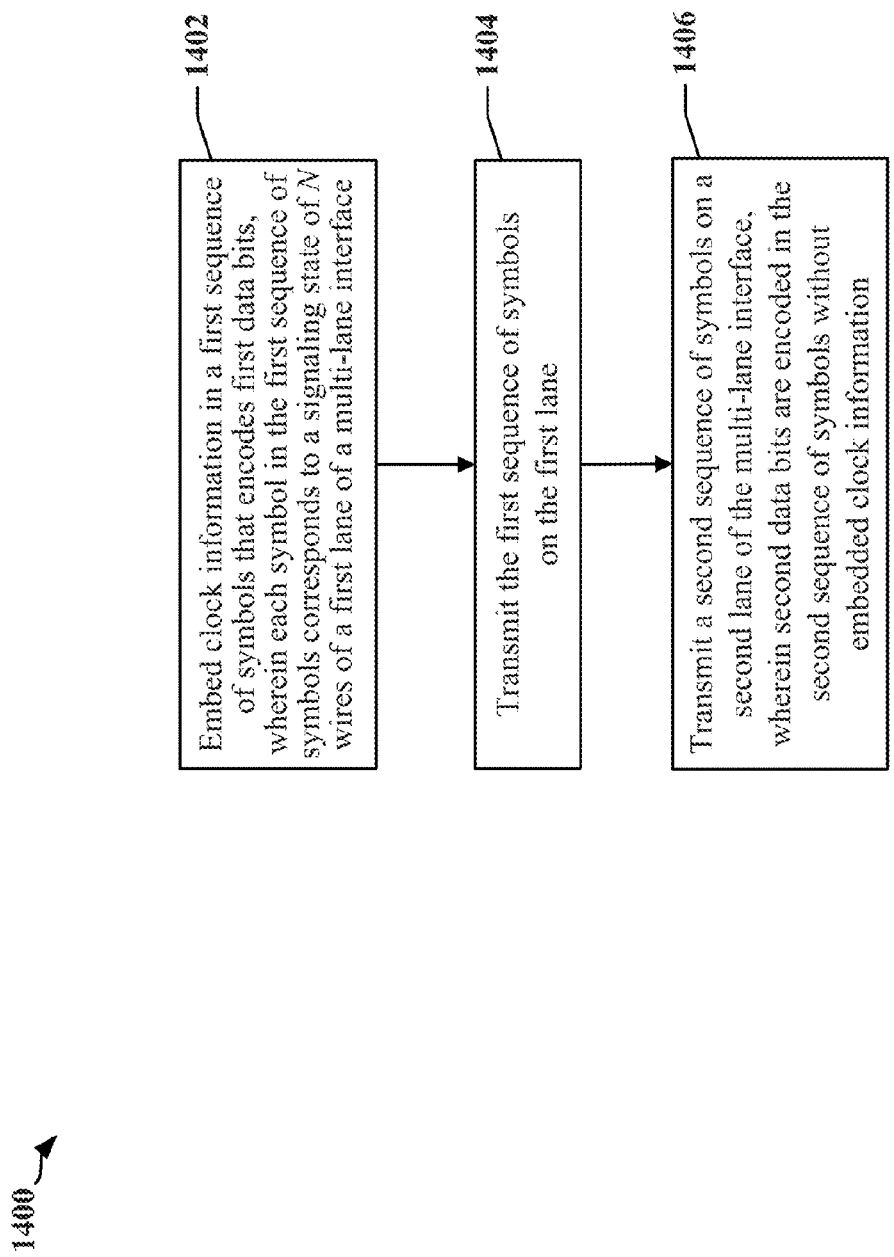
FIG. 14 is a flow chart of a method for operating a transmitter in a multi-lane N-wire interface provided according to one or more aspects disclosed herein.

FIG. 14 is a flowchart 1400 illustrating a method for data communications on an N-wire communications link. The communications link may include a plurality of connectors that carry symbols encoded using a suitable encoding scheme, such as N! encoding, multiphase encoding, multi-wire differential encoding, etc. The connectors may include electrically conductive wires, optical signal conductors, semi-conductive interconnects and so on. The method may be performed by one or more processors of a receiving device.

At step 1402, clock information is embedded in a first sequence of symbols that encodes first data bits. Each of the first sequence of symbols may correspond to a signaling state of N wires of a first lane of a multi-lane interface. The clock information may be encoded by using a transcoder to convert the first data bits to a set of transition numbers, and convert the set of transition numbers to obtain the first sequence of symbols. The second data bits may be encoded in the second sequence of symbols without using a transcoder.

At step 1404, the first sequence of symbols is transmitted on the first lane.

At step 1406, a second sequence of symbols is transmitted on a second lane of the multi-lane interface. The second sequence of symbols may be encoded with second data bits and without embedded clock information.

In accordance with certain aspects disclosed herein, the first sequence of symbols may be transmitted by transmitting the first sequence of symbols in $_NC_2$ differential signals on $_NC_2$ different pairs of the N wires. The second lane may include M wires. The second sequence of symbols may be transmitted in $_MC_2$ differential signals on $_MC_2$ different pairs of the M wires. The values of M and N may be equal or different.

In accordance with certain aspects disclosed herein, the second sequence of symbols may be transmitted on M wires of a serial bus. Transmitting the second sequence of symbols may include transmitting the second set of data in M/2 differential signals.

In accordance with certain aspects disclosed herein, each of the first sequence of symbols is transmitted in a different symbol interval. Embedding the clock information may include causing a transition in the signaling state of the N wires or in the signaling state of one or more wires of the second lane between each pair of consecutive symbols in the first sequence of symbols.

In accordance with certain aspects disclosed herein, a single transcoder circuit may be used to encode the first data bits in the first sequence of symbols and to encode the second data bits in the second sequence of symbols.

In accordance with certain aspects disclosed herein, embedding the clock information includes causing a transition in the signaling state of the N wires between each pair of consecutive symbols in the first sequence of symbols or in the signaling state of M wires of the second lane between each pair of consecutive symbols in the second sequence of symbols. The clock information may relate to a transmit clock used to encode both the first sequence of symbols and the second sequence of symbols.

In accordance with certain aspects disclosed herein, a data element may be divided to obtain the first set of data bits and the second set of data bits. A first symbol corresponding to the first set of data bits may be transmitted on the first lane concurrently with transmission of a second symbol corresponding to the second set of data bits on the second lane.

Figure 15:
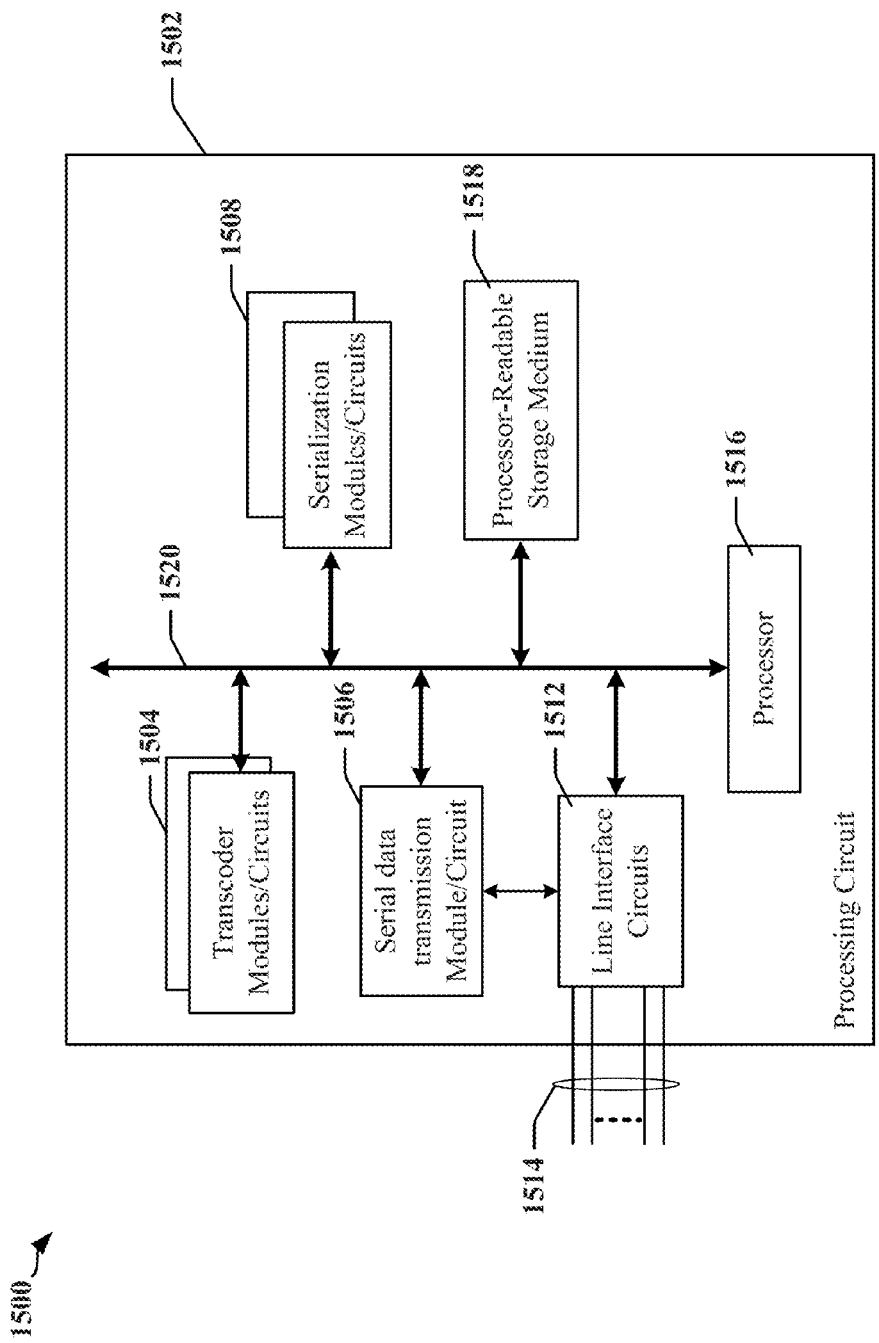
FIG. 15 is a diagram illustrating a simplified example of a transmitter in a multi-lane N-wire interface provided according to one or more aspects disclosed herein.

FIG. 15 is a diagram illustrating a simplified example of a hardware implementation for an apparatus 1500 employing a processing circuit 1502. The processing circuit typically has a processor 1510 that may include one or more of a microprocessor, microcontroller, digital signal processor, a sequencer and a state machine. The processing circuit 1502 may be implemented with a bus architecture, represented generally by the bus 1520. The bus 1520 may include any number of interconnecting buses and bridges depending on the specific application of the processing circuit 1502 and the overall design constraints. The bus 1520 links together various circuits including one or more processors and/or hardware modules, represented by the processor 1516, the modules and/or circuits 1504, 1506 and 1508, line interface circuits 1512 configurable to communicate over connectors or wires 1514 and the processor-readable/computer-readable storage medium 1518. The bus 1520 may also link various other circuits such as timing sources, peripherals, voltage regulators, and power management circuits, which are well known in the art, and therefore, will not be described any further.

The processor 1516 is responsible for general processing, including the execution of software stored on the computer-readable storage medium 1518. The software, when executed by the processor 1516, causes the processing circuit 1502 to perform the various functions described supra for any particular apparatus. The computer-readable storage medium 1518 may also be used for storing data that is manipulated by the processor 1516 when executing software, including data decoded from symbols transmitted over the connectors 1514. The processing circuit 1502 further includes at least one of the modules and/or circuits 1504, 1506 and 1508. The modules and/or circuits 1504, 1506 and 1508 may be software modules running in the processor 1516, resident/stored in the computer-readable storage medium 1518, one or more hardware modules coupled to the processor 1516, or some combination thereof. The modules and/or circuits 1504, 1506 and/or 1508 may include microcontroller instructions, state machine configuration parameters, or some combination thereof.

In one configuration, the apparatus 1500 for wireless communication includes a module and/or circuit 1504 configured to embed information with first data bits encoded in a first sequence of symbols, modules and/or circuits 1506, 1512 configured to transmit the first sequence of symbols on a first lane of a multi-lane interface the first lane, modules and/or circuits 1504, 1506 and/or 1508 configured to transmit a second sequence of symbols on a second lane of the multi-lane interface. In one example, the circuits illustrated in FIGS. 6-9 and 11 provides logic which implement the various functions performed by the processing circuit 1502.

In an aspect of the disclosure, a processor-readable/computer-readable storage medium 1518 has one or more instructions stored or maintained thereon. When executed by at least one processor 1516 of the processing circuit 1502, the instructions may cause the processor 1516 to embed clock information with first data bits encoded in a first sequence of symbols, transmit the first sequence of symbols on a first lane of the multi-lane interface 1514, and transmit a second sequence of symbols on a second lane of the multi-lane interface 1514. Each of the first sequence of symbols may correspond to a signaling state of N wires of a first lane of a multi-lane interface 1514. The second sequence of symbols may be encoded with second data bits and without embedded clock information.

The aforementioned means may be implemented, for example, using some combination of a processor 206 or 236, physical layer drivers 210 or 240 and storage media 208 and 238.

Exemplary Description of Multi-Wire Symbol Transition Link with a Dedicated Clock As described above, multi-wire symbol transition clocking may be implemented by embedding a clock into symbol transitions. However, an embedded clock requires clock and data recovery (CDR) logic/circuitry at a receiving device to recover the embedded clock from the symbol transitions. Such CDR logic/circuitry may be complex or expensive to implement by some receiving devices. Embedded clocks may also suffer from symbol slip errors due to excess jitters, inter lane skews, signal spikes, and other causes.

In an aspect of the disclosure, an N! multi-wire bus/link may be used to facilitate the transmission of symbols in which an embedded clock is encoded/embedded in guaranteed symbol transitions while a dedicated clock line is used to transmit a dedicated clock. In other aspects of the disclosure, the bus/link may be a single-ended multi-wire bus/link. The dedicated clock transmitted via the dedicated clock line facilitates a receiver to decode the symbols transmitted over the multi-wire bus/link without using CDR logic/circuitry and without having to rely on the embedded clock. Thus, use of the dedicated clock line for receiving the dedicated clock allows the receiver to forgo implementing the CDR logic/circuitry, and consequently, minimize the complexity and cost associated with such implementation, as well as reduce symbol slip errors related to an embedded clock.

In another aspect, in a system using the dedicated clock line to transmit/receive a clock signal, a separate clock does not need to be encoded/embedded in symbol transitions of a sequence of symbols to be transmitted. Accordingly, it is not mandatory upon the system to guarantee a transition between each symbol in the sequence of symbols, and therefore, the system is able to interleave symbols of different types on a data lane and across multiple data lanes. Moreover, because no clock recovery from symbol transitions may occur in such system, circuitry/modules for converting raw symbols into symbols with guaranteed transitions may be omitted at a transmitter and circuitry/modules for converting symbols with guaranteed transitions into raw symbols may be omitted at a receiver, thus minimizing the complexity and cost associated with implementing such circuitry/modules.

In a further aspect, in a system using the dedicated clock line to transmit/receive a clock signal, the clock signal is separately transmitted from a data signal, and therefore, the direction of the data signal transmission is not constrained by the direction of the clock signal transmission. Hence, such system allows for a clock signal to be transmitted over the dedicated clock line from a first device to a second device while data/symbols associated with the clock signal are transmitted from the second device to the first device. Moreover, such system is now able to make use of the multi-wire bus/Bank and/or the dedicated clock line for bi-directional transmissions. Thus, both the first device and the second device may utilize the multi-wire bus/link for transmissions by interleaving the lines of the multi-wire bus/link and/or alternately transmitting a dedicated clock over the dedicated clock line.

Figure 16:
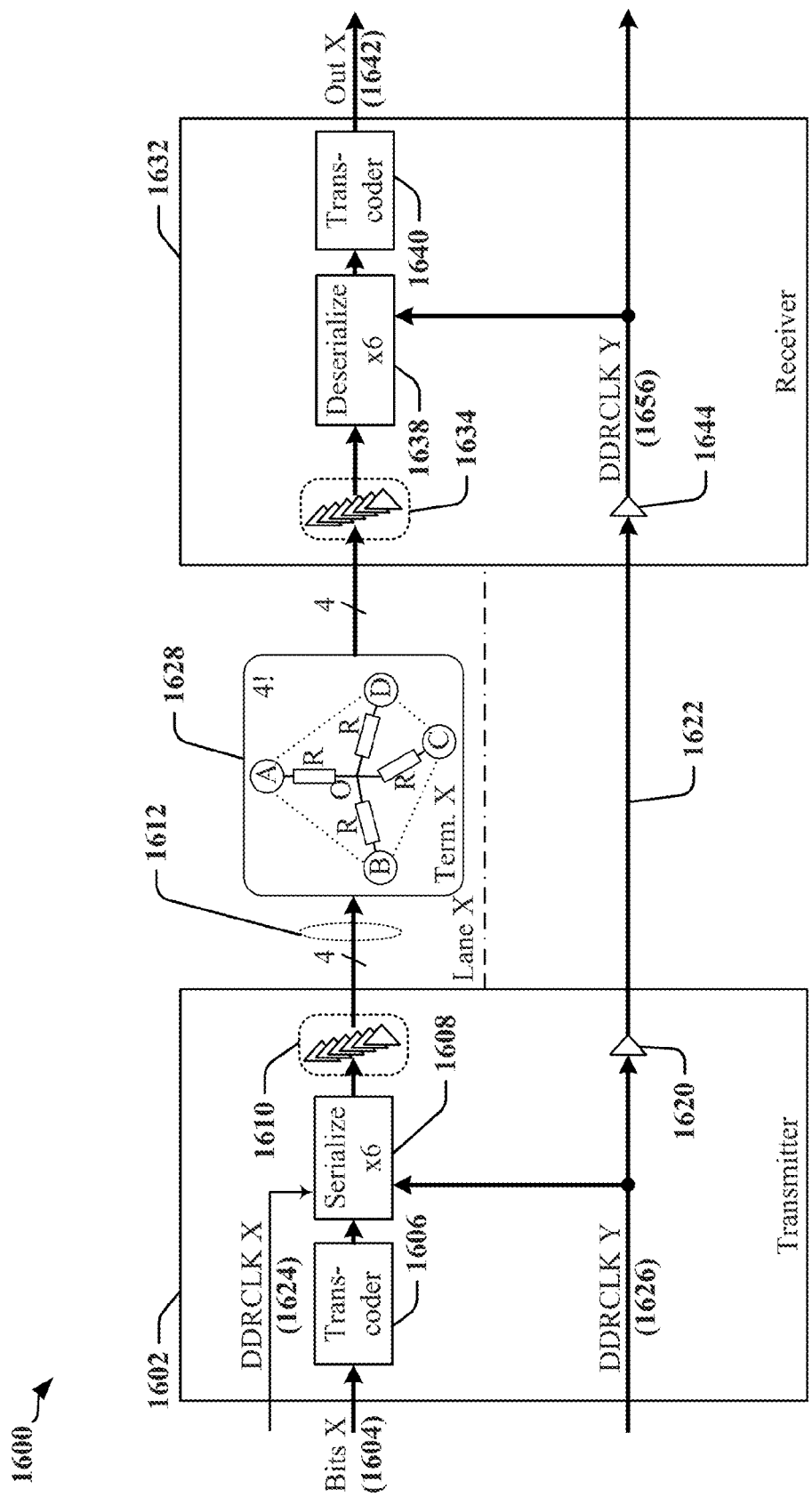
FIG. 16 is a diagram illustrating a further example of a multi-lane interface provided between two devices according to one or more aspects disclosed herein.

FIG. 16 is a diagram illustrating a further example of a multi-lane interface 1600 provided between two devices 1602 and 1632. At a transmitter 1602, a transcoder 1606 may be used to encode data 1604 and clock information in symbols to be transmitted over a set of N wires on a lane (or "multi-wire link") 1612 using N-factorial (N!) encoding for example, where N is an integer greater than 2. The clock information may be derived from a first transmit clock (e.g., DDRCLK X) 1621 or a second transmit clock (e.g., DDRCLK Y) 1626, and may be encoded in a sequence of symbols transmitted in $_{N}C_{2}$ differential signals over the N wires by ensuring that a signaling state transition occurs on at least one of the $_{N}C_{2}$ signals between consecutive symbols. When N! encoding is used to drive the N wires, each bit of a symbol is transmitted as a differential signal by one of a set of line drivers 1610, where the differential drivers in the set of line drivers 1610 are coupled to different pairs of the N wires. The number of available combinations of wire pairs and signals may be calculated to be $_{N}C_{2}$, and the number of available combinations determines the number of signals that can be transmitted over the N wires. The number of data bits 1604 that can be encoded in a symbol may be calculated based on the number of available signaling states available for each symbol transmission interval.

A termination impedance (typically resistive) couples each of the N wires to a common center point in a termination network 1628. It will be appreciated that the signaling states of the N wires reflects a combination of the currents in the termination network 1628 attributed to the differential drivers 1610 coupled to each wire. It will be further appreciated that the center point of the termination network 1628 is a null point, whereby the currents in the termination network 1628 cancel each other at the center point.

At least one of the $_{N}C_{2}$ signals in the link transitions between consecutive symbols. Effectively, the transcoder 1606 ensures that a transition occurs between each pair of symbols transmitted on the N wires by producing a sequence of symbols in which each symbol is different from its immediate predecessor symbol. In the example depicted in FIG. 16, the lane 1612 has N=4 wires and the set of 4 wires can carry $_{4}C_{2}$=6 differential signals. The transcoder 1606 may employ a mapping scheme to generate raw symbols for transmission on the N wires available on the lane 1612. The transcoder 1606 and serializer 1608 cooperate to produce raw symbols for transmission based on the input data bits 1604. At the receiver 1632, transcoder 1640 may employ a mapping to determine a transition number that characterizes a difference between a pair of consecutive raw symbols, symbols in a lookup table, for example. The transcoders 1606, 1640 operate on the basis that every consecutive pair of raw symbols includes two different symbols.

The transcoder 1606 at the transmitter 1602 may select between the N!−1 states that are available at every symbol transition. In one example, a 4! system provides 4!=23 signaling states for the next symbol to be transmitted at each symbol transition. The bit rate may be calculated as $\log_{2}$(available_states) per cycle of the first transmit clock 1624 or the second transmit clock 1626. In a system using double data rate (DDR) clocking, symbol transitions occur at both the rising edge and falling edge of the first transmit clock 1624 or the second transmit clock 1626. In one example, two or more symbols can be transmitted per word (i.e., per transmit clock cycle), such that the total available states in the transmit clock cycle is $(_{N}C_{2}-1)^{2}=(23)^{2}=529$ and the number of data bits 1604 that can transmitted per symbol may be calculated as $\log_{2}(529)=9.047$ bits.

In an aspect, the second transmit clock 1626 used to encode the data 1604 may be transmitted to a receiver 1632 using a line driver 1620. For example, the line driver 1620 may generate a clock signal based on the second transmit clock 1626 and transmit the clock signal over a dedicated clock line 1622. The dedicated clock line 1622 is separate from and in parallel with the lane/multi-wire link 1612, and may be limited to communicating clock signals between the transmitter 1602 and the receiver 1632.

The receiver 1632 receives the sequence of symbols using a set of line receivers 1634, where each receiver in the set of line receivers 1634 determines differences in signaling states on one pair of the N wires. Accordingly, $_{N}C_{2}$ receivers are used in the lane 1612, where N represents the number of wires in the lane 1612. The $_{N}C_{2}$ receivers 1634 produce a corresponding number of raw symbols as outputs.

The receiver 1632 receives the clock signal transmitted over the dedicated clock line 1622 using a line receiver 1644. Upon receipt of the clock signal over the dedicated clock line 1622, the line receiver 1644 generates a receive clock (e.g., DDRCLK Y) 1656 that corresponds to the second transmit clock 1626.

In the depicted example, the lane 1612 has N=4 wires and the signals received on the four wires of the lane 1612 are processed by a set of line receivers 1634 that includes 6 receivers ($_{4}C_{2}$=6) to produce a state transition signal that is provided to a deserializer 1638. The deserializer 1638 deserializer symbols based on the state transition signal from the set of line receivers 1634 and the receive clock 1656 (corresponding to the second transmit clock 1626). The receive clock 1656 may be used by external circuitry to receive data provided by a transcoder 1640. The transcoder 1640 decodes a block of received symbols from the deserializer 1638 by comparing each next symbol to its immediate predecessor. The transcoder 1640 produces output data 1642 that corresponds to the data 1604 provided to the transmitter 1602. Accordingly, because the receiver 1632 may utilize the second transmit clock 1626 provided via the dedicated clock line 1622 to decode received symbols corresponding to the data 1604, the receiver 1632 does not require CDR logic/circuitry to recover the first transmit clock 1624 that may be embedded in transitions between the received symbols. Hence, the receiver 1632 may ignore the first transmit clock 1624.

As illustrated in the example of FIG. 16, the lane (or "multi-wire link") 1612 may be operated according to the following examples. In one example, data bits 1604 for transmission over the lane (in this example, Lane X) 1612 are received by the transcoder 1606 which generates a set of raw symbols that, when transmitted in a predetermined sequence, ensure that a transition of signaling state occurs in at least one signal transmitted on the 4 wires of the lane 1612. The serializer 1608 produces a sequence of symbol values provided to the line drivers 1610 that determine the signaling state of the 4 wires of the lane 1612 for each symbol interval.

In another example, data bits 1604 are received by the transcoder 1606 of the lane (in this example, Lane X) 1612. The transcoder 1606 generates a set of transition numbers that are serialized by the serializer 1608 that converts the set of transition numbers to a sequence of symbol values provided to the line drivers 1610 that determine the signaling state of the 4 wires of the lane 1612 for each symbol interval. The sequence of the raw symbols ensure that a transition of signaling state occurs in at least one signal transmitted on the 4 wires of the lane 1612 between each pair of consecutive symbols.

In an aspect, at least one line/wire of the lane (or "multi-wire link") 1612 is bi-directional. Accordingly, the transmitter 1602 may be configured to receive a sequence of symbols transmitted from the receiver 1632 over the at least one bi-directional line/wire of the lane 1612. In a further aspect, the dedicated clock line 1622 is bi-directional and can be driven by either of the transmitter 1602 or the receiver 1632 transmitting over the lane 1612. For example, the transmitter 1602 may be configured to receive a dedicated clock signal from the receiver 1632 over the dedicated clock line 1622. The dedicated clock signal may be associated with a transmit clock used to encode the sequence of symbols transmitted by the receiver over the at least one bi-directional line/wire of the lane 1612.

Figure 17:
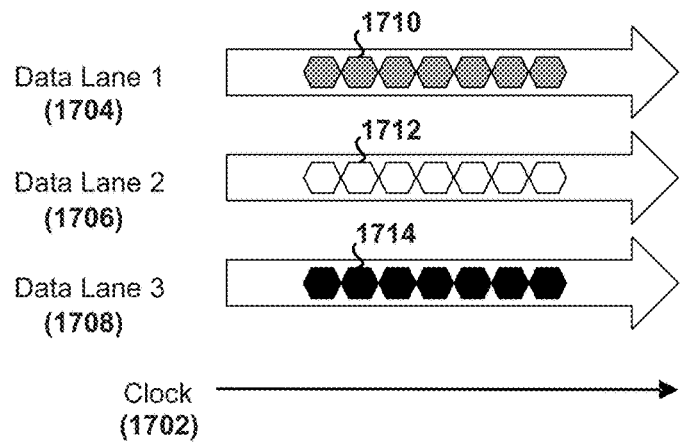
FIG. 17 illustrates examples of transmitting symbols on multiple data lanes using a dedicated clock line.
Figure 17:
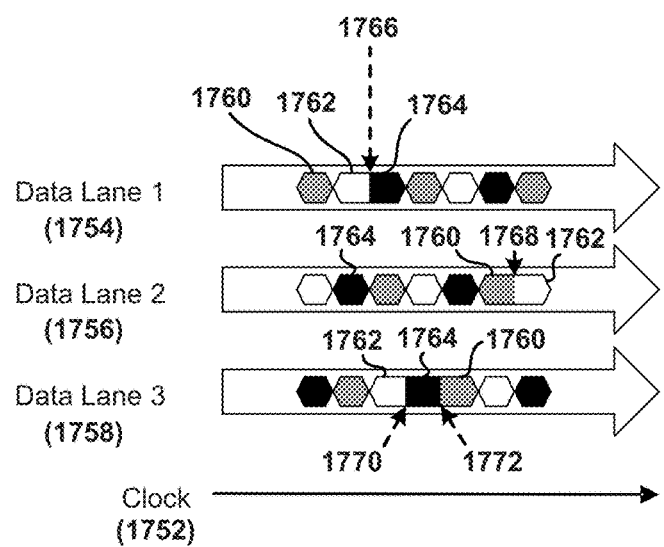

FIG. 17 illustrates examples of transmitting symbols on multiple data lanes using a dedicated clock line. In example 1700, symbols of a first type 1710 are transmitted on a first data lane (Data Lane 1) 1704, symbols of a second type 1712 are transmitted on a second data lane (Data Lane 2) 1706, and symbols of a third type 1714 are transmitted on a third data lane (Data Lane 3) 1708. The symbols of the first type 1710, the second type 1712, and the third type 1714 may all be transmitted on their respective data lanes according to a clock signal separately transmitted on a dedicated clock line 1702.

As described above, in a system using the dedicated clock line to transmit/receive a clock signal, a separate clock does not need to be encoded/embedded in symbol transitions of a sequence of symbols to be transmitted. Hence, a transmitter does not have to guarantee a transition of signaling state between each symbol in the sequence of symbols. Accordingly, referring to example 1750, the transmitter is able to interleave symbols of different types on a data lane and across multiple data lanes. For example, a symbol of a first type 1760, a symbol of a second type 1762, and a symbol of third type 1764 may be interleaved and transmitted on a first data lane (Data Lane 1) 1754. Moreover, a symbol of the second type 1762, a symbol of the third type 1764, and a symbol of the first type 1760 may be interleaved and transmitted on a second data lane (Data Lane 2) 1756. Also, a symbol of the third type 1764, a symbol of the first type 1760, and a symbol of the second type 1762 may be interleaved and transmitted on a third data lane (Data Lane 3) 1758.

In an aspect, the symbol of the second type 1762 and the symbol of the third type 1764 can be transmitted on a data lane (e.g., the first data lane 1754) without a transition of signaling state between the symbols (see 1766). Moreover, the symbol of the first type 1760 and the symbol of the second type 1762 can be transmitted on a data lane (e.g., the second data lane 1756) without a transition of signaling state between the symbols (see 1768). Also, the symbol of the second type 1762, the symbol of the third type 1764, and the symbol of the first type 1760 can be transmitted on a data lane (e.g., the third data lane 1758) without a transition of signaling state between any pair of symbols (see 1770 and 1772). The symbols of the first type 1760, the second type 1762, and the third type 1764 may all be transmitted on each of the data lanes according to a clock signal separately transmitted on a dedicated clock line 1752.

Figure 18:
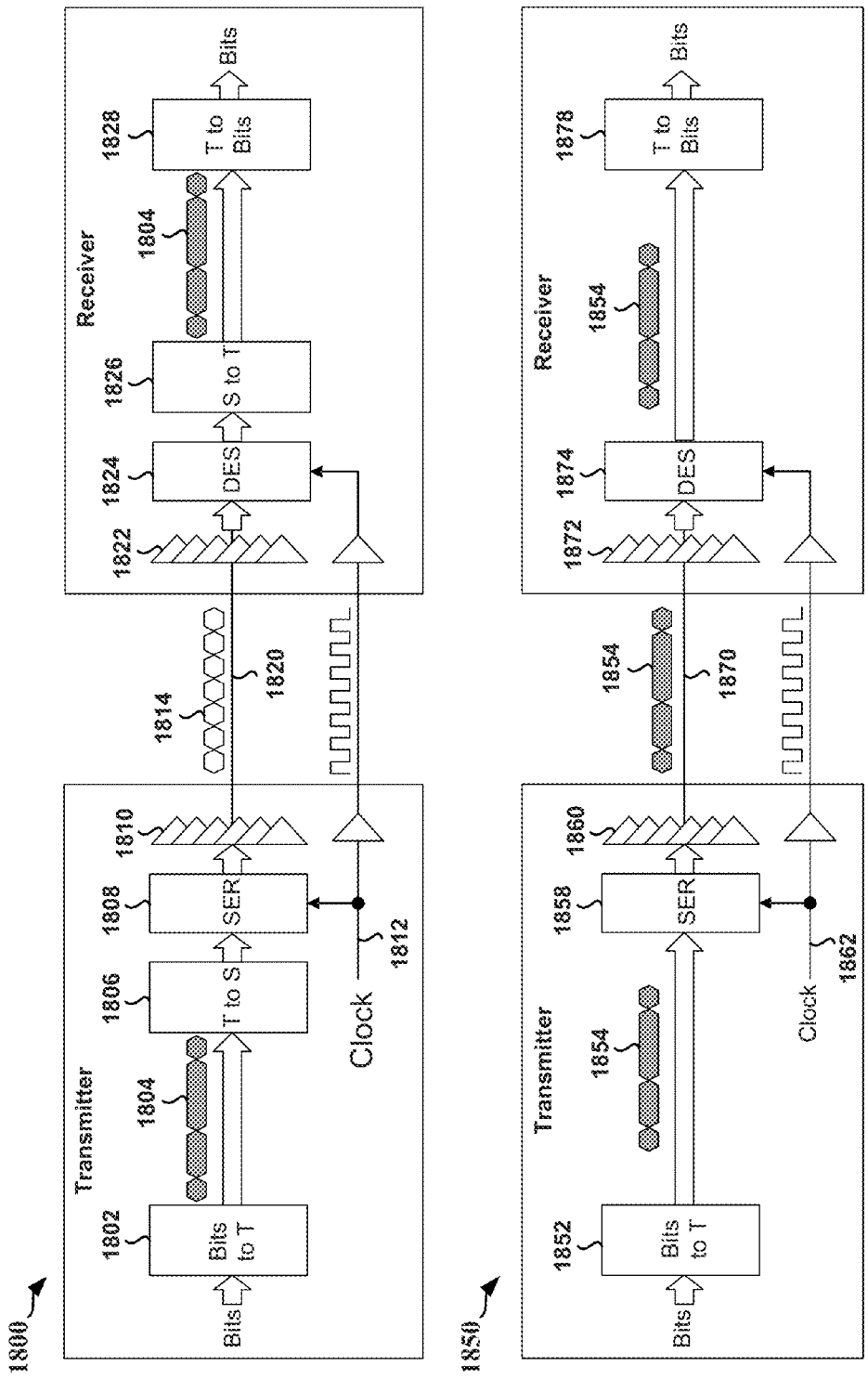
FIG. 18 illustrates examples of multi-wire transcoding using a dedicated clock line.

FIG. 18 illustrates examples of multi-wire transcoding using a dedicated clock line. In a first example 1800, at a transmitter, data bits to be transmitted are received by a bits-to-transition symbol converter (Bits to T) 1802. Based on the data bits, the Bits to T 1802 generates a set of raw transition symbols 1804 for transmission over a multi-wire link 1820. The set of raw transition symbols 1804 are fed into a transition symbol-to-symbol converter (T to S) 1806. The T to S 1806 selects raw transition symbols for transmission such that a transition of signaling state is guaranteed between each symbol, thus allowing for clock information to be encoded/embedded in the symbol transitions. The symbols output by the T to S 1806 may be serialized by serializer (SER) 1808 based on a clock signal that is transmitted on a dedicated clock line 1812. The SER 1808 produces a sequence of symbols that determine the signaling state of wires of the multi-wire link 1820. The sequence of symbols 1814 are provided to line drivers 1810 for transmission on the multi-wire link 1820.

Still referring to the first example 1800, at a receiver, the process described above with respect to the transmitter is reversed. A deserializer (DES) 1824 receives the sequence of symbols 1814 via line receivers 1822. The DES 1824 deserializes the received symbols based on the clock signal received on the dedicated clock line 1812. The output of the DES 1824 is fed into a symbol-to-transition symbol converter (S to T) 1826. The S to T 1826 recovers the raw transition symbols 1804 based on the transitions present between each deserialized symbol. A transition symbol-to-bits converter (T to Bits) 1828 then converts the recovered raw transition symbols into data bits (Bits).

As described above, in a system using the dedicated clock line to transmit/receive a clock signal, a separate clock does not need to be encoded/embedded in symbol transitions of a sequence of symbols to be transmitted. Accordingly, referring to a second example 1850 of multi-wire transcoding using a dedicated clock line, if no clock information is to be encoded/embedded in symbol transitions, then a transmitter does not have to guarantee a transition between each symbol in the sequence of symbols. Moreover, because no clock information will be embedded in symbol transitions at the transmitter, or recovered from symbol transitions at the receiver, circuitry/modules for converting raw symbols into symbols with guaranteed transitions may be omitted at the transmitter and circuitry/modules for converting symbols with guaranteed transitions into raw symbols may be omitted at the receiver, thus minimizing the complexity and cost associated with implementing such circuitry/modules.

For instance in the second example 1850, at a transmitter, data bits to be transmitted are received by a bits-to-transition symbol converter (Bits to T) 1852. Based on the data bits, the Bits to T 1852 generates a set of raw transition symbols 1854 for transmission over a multi-wire link 1870. Because no clock information is to be encoded/embedded in symbol transitions, the transmitter does not have to guarantee a transition of signaling state between each symbol of the set of symbols to be transmitted. Hence, a transition symbol-to-symbol converter (e.g., T to S 1806 of first example 1800) may be omitted at the transmitter of second example 1850 and the raw transition symbols 1854 may be fed directly to a serializer (SER) 1858. The raw transition symbols 1854 may be serialized by the SER 1858 based on a clock signal that is transmitted on a dedicated clock line 1862. The SER 1858 produces a sequence of symbols that determine the signaling state of wires of the multi-wire link 1870. The sequence of symbols 1854 are provided to line drivers 1860 for transmission on the multi-wire link 1870.

Still referring to the second example 1850, at a receiver, the process described above with respect to the transmitter is reversed. A deserializer (DES) 1874 receives the sequence of symbols 1854 via line receivers 1872. The DES 1874 deserializes the received symbols based on the clock signal received on the dedicated clock line 1862 to recover the set of raw transition symbols 1854. Notably, because no clock information was encoded/embedded in symbol transitions, the receiver does not have to recover the raw transition symbols based on transitions present between each deserialized symbol. Hence, a symbol-to-transition symbol converter (e.g., S to T 1826 of first example 1800) may be omitted at the receiver of second example 1850. A transition symbol-to-bits converter (T to Bits) 1878 converts the recovered raw transition symbols into data bits (Bits). In an aspect, the second example 1850 improves throughput as it allows for one extra state per symbol to be transmitted.

Exemplary Receiving Device and Method Thereon

Figure 19:
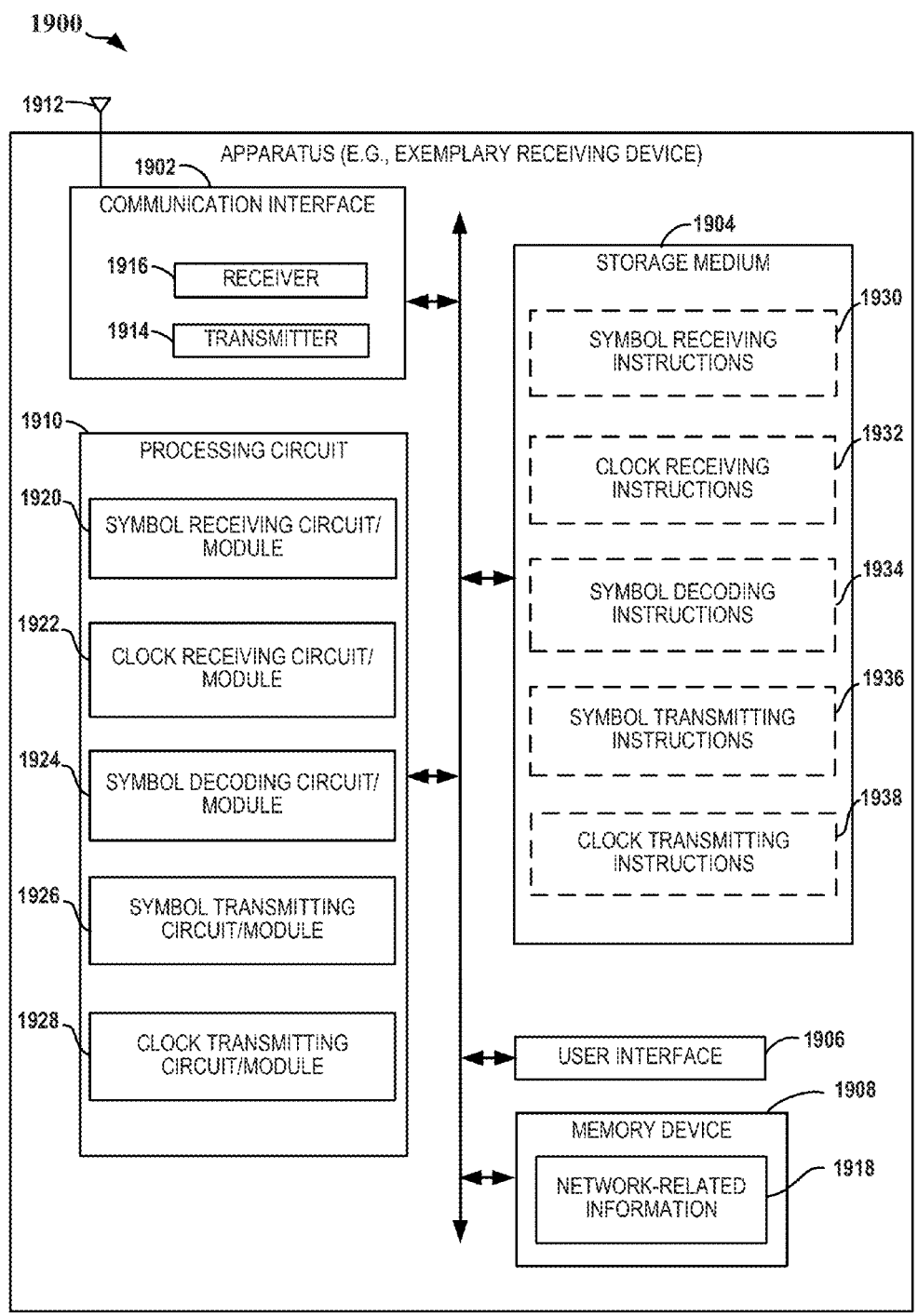
FIG. 19 is an illustration of an apparatus (receiving device) configured to support operations related to communicating data bits over a multi-wire link according to one or more aspects disclosed herein.

FIG. 19 is an illustration of an apparatus (receiving device) 1900 configured to support operations related to communicating data hits over a multi-wire link according to one or more aspects of the disclosure (e.g., aspects related to the method of FIG. 20 described below). The apparatus 1900 includes a communication interface (e.g., at least one transceiver) 1902, a storage medium 1904, a user interface 1906, a memory device 1908, and a processing circuit 1910.

These components can be coupled to and/or placed in electrical communication with one another via a signaling bus or other suitable component, represented generally by the connection lines in FIG. 19. The signaling bus may include any number of interconnecting buses and bridges depending on the specific application of the processing circuit 1910 and the overall design constraints. The signaling bus links to other various circuits such that each of the communication interface 1902, the storage medium 1904, the user interface 1906, and the memory device 1908 are coupled to and/or in electrical communication with the processing circuit 1910. The signaling bus may also link various other circuits (not shown) such as timing sources, peripherals, voltage regulators, and power management circuits, which are well known in the art, and therefore, will not be described any further.

The communication interface 1902 may be adapted to facilitate wireless communication of the apparatus 1900. For example, the communication interface 1902 may include circuitry and/or code (e.g., instructions) adapted to facilitate the communication of information bi-directionally with respect to one or more communication devices in a network. The communication interface 1902 may be coupled to one or more antennas 1912 for wireless communication within a wireless communication system. The communication interface 1902 can be configured with one or more standalone receivers and/or transmitters, as well as one or more transceivers. In the illustrated example, the communication interface 1902 includes a transmitter 1914 and a receiver 1916.

The memory device 1908 may represent one or more memory devices. As indicated, the memory device 1908 may maintain network-related information 1918 along with other information used by the apparatus 1900. In some implementations, the memory device 1908 and the storage medium 1904 are implemented as a common memory component. The memory device 1908 may also be used for storing data that is manipulated by the processing circuit 1910 or some other component of the apparatus 1900.

The storage medium 1904 may represent one or more computer-readable, machine-readable, and/or processor-readable devices for storing code, such as processor executable code or instructions (e.g., software, firmware), electronic data, databases, or other digital information. The storage medium 1904 may also be used for storing data that is manipulated by the processing circuit 1910 when executing code. The storage medium 1904 may be any available media that can be accessed by a general purpose or special purpose processor, including portable or fixed storage devices, optical storage devices, and various other mediums capable of storing, containing or carrying code.

By way of example and not limitation, the storage medium 1904 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 1904 may be embodied in an article of manufacture (e.g., a computer program product). By way of example, a computer program product may include a computer-readable medium in packaging materials. In view of the above, in some implementations, the storage medium 1904 may be a non-transitory (e.g., tangible) storage medium.

The storage medium 1904 may be coupled to the processing circuit 1910 such that the processing circuit 1910 can read information from, and write information to, the storage medium 1904. That is, the storage medium 1904 can be coupled to the processing circuit 1910 so that the storage medium 1904 is at least accessible by the processing circuit 1910, including examples where at least one storage medium is integral to the processing circuit 1910 and/or examples where at least one storage medium is separate from the processing circuit 1910 (e.g., resident in the apparatus 1900, external to the apparatus 1900, distributed across multiple entities, etc.).

Code and/or instructions stored by the storage medium 1904, when executed by the processing circuit 1910, causes the processing circuit 1910 to perform one or more of the various functions and/or process operations described herein. For example, the storage medium 1904 may include operations configured for regulating operations at one or more hardware blocks of the processing circuit 1910, as well as to utilize the communication interface 1902 for wireless communication utilizing their respective communication protocols.

The processing circuit 1910 is generally adapted for processing, including the execution of such code/instructions stored on the storage medium 1904. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1910 is arranged to obtain, process and/or send data, control data access and storage, issue commands, and control other desired operations. The processing circuit 1910 may include circuitry configured to implement desired code provided by appropriate media in at least one example. For example, the processing circuit 1910 may be implemented as one or more processors, one or more controllers, and/or other structure configured to execute executable code. Examples of the processing circuit 1910 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1910 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1910 are for illustration and other suitable configurations within the scope of the disclosure are also contemplated.

According to one or more aspects of the disclosure, the processing circuit 1910 may be adapted to perform any or all of the features, processes, functions, operations and/or routines for any or all of the apparatuses described herein. As used herein, the term "adapted" in relation to the processing circuit 1910 may refer to the processing circuit 1910 being one or more of configured, employed, implemented, and/or programmed to perform a particular process, function, operation and/or routine according to various features described herein.

Figure 20:
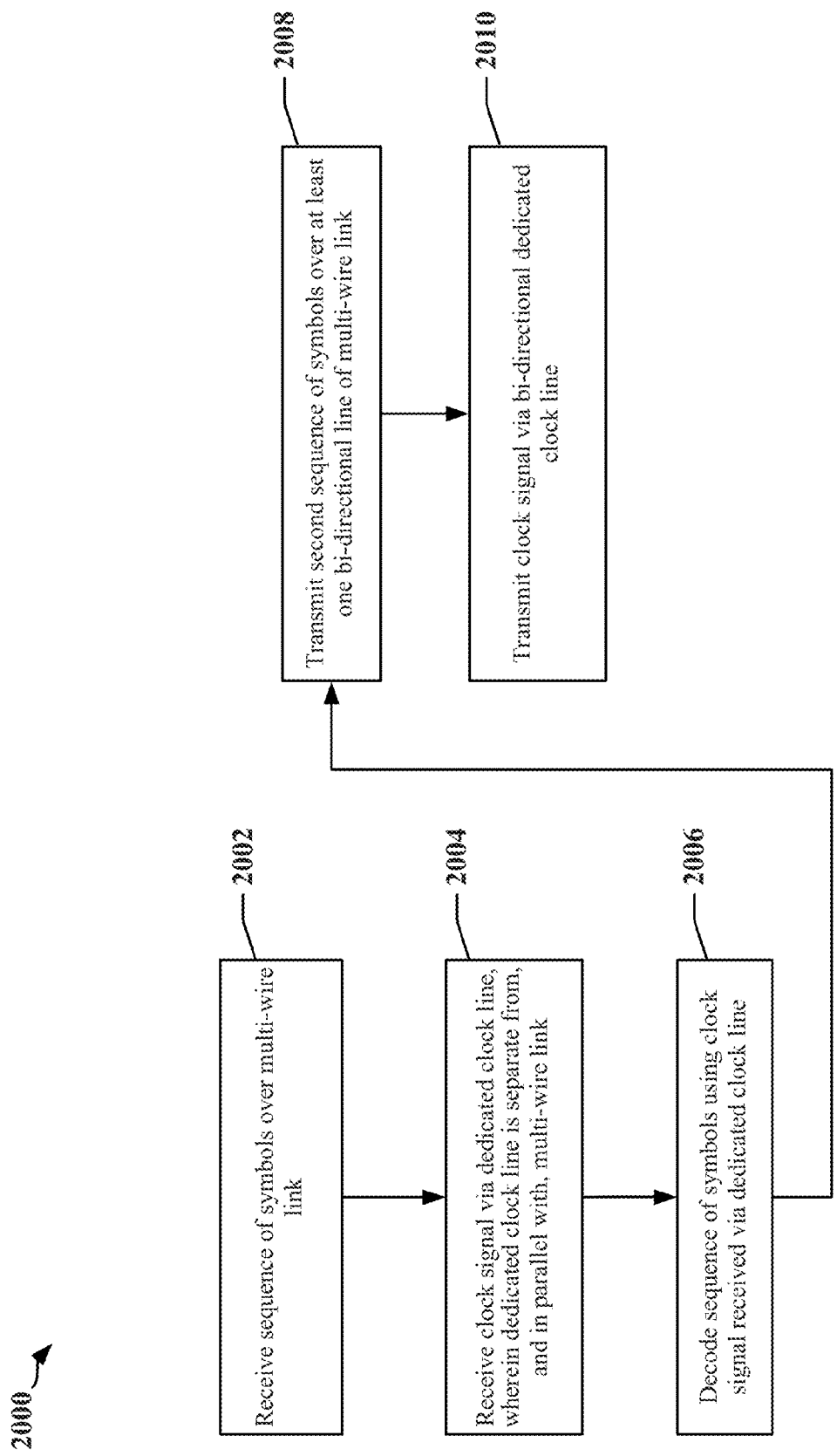
FIG. 20 is a flowchart illustrating a method of a receiving device for communicating data bits over a multi-wire link.

According to at least one example of the apparatus 1900, the processing circuit 1910 may include one or more of a symbol receiving circuit/Module 1920, a clock receiving circuit/module 1922, a symbol decoding circuit/module 1924, a symbol transmitting circuit/module 1926, and a clock transmitting circuit/module 1928 that are adapted to perform any or all of the features, processes, functions, operations and/or routines described herein (e.g., features, processes, functions, operations and/or routines described with respect to FIG. 20).

The symbol receiving circuit/module 1920 may include circuitry and/or instructions (e.g., symbol receiving instructions 1930 stored on the storage medium 1904) adapted to perform several functions relating to, for example, receiving a sequence of symbols over a multi-wire link.

The clock receiving circuit/module 1922 may include circuitry and/or instructions (e.g., clock receiving instructions 1932 stored on the storage medium 1904) adapted to perform several functions relating to, for example, receiving a clock signal via a dedicated clock line, wherein the dedicated clock line is separate from, and in parallel with, the multi-wire link.

The symbol decoding circuit/module 1924 may include circuitry and/or instructions (e.g., symbol decoding instructions 1934 stored on the storage medium 1904) adapted to perform several functions relating to, for example, decoding the sequence of symbols using the clock signal. In an aspect, a second clock signal may be embedded in guaranteed transitions between pairs of consecutive symbols in the sequence of symbols. Thus, the symbol decoding circuit/module 1924 may be configured to perform the decoding by decoding the sequence of symbols using the clock signal received via the dedicated dock line while ignoring the second clock signal. The symbol decoding circuit/module 1924 may be configured to perform the decoding by converting the sequence of symbols to a set of data bits using the clock signal. The symbol decoding circuit/module 1924 may be configured to perform the converting by using a transcoder to convert the sequence of symbols to a set of transition numbers and converting the set of transition numbers to the set of data bits.

The symbol transmitting circuit/module 1926 may include circuitry and/or instructions (e.g., symbol transmitting instructions 1936 stored on the storage medium 1904) adapted to perform several functions relating to, for example, transmitting a second sequence of symbols over at least one bi-directional line of the multi-wire link based on the clock signal received via the dedicated clock line.

The clock transmitting circuit/module 1928 may include circuitry and/or instructions (e.g., clock transmitting instructions 1938 stored on the storage medium 1904) adapted to perform several functions relating to, for example, transmitting a third clock signal via the dedicated clock line. The third clock signal may be associated with a transmit clock used to encode data bits into a sequence of symbols transmitted by the symbol transmitting circuit/module 1926 over the at least one bi-directional line of the multi-wire link.

As mentioned above, instructions stored by the storage medium 1904, when executed by the processing circuit 1910, causes the processing circuit 1910 to perform one or more of the various functions and/or process operations described herein. For example, the storage medium 1904 may include one or more of the symbol receiving instructions 1930, the clock receiving instructions 1932, the symbol decoding instructions 1934, the symbol transmitting instructions 1936, and the clock transmitting instructions 1938.

FIG. 20 is a flowchart 2000 illustrating a method of communicating data bits over a multi-wire link. The method may be performed by a receiving device (e.g., apparatus 100 of FIG. 1, receiver 1632 of FIG. 16, or apparatus 1900 of FIG. 19).

The receiving device receives a sequence of symbols over a multi-wire link (e.g., multi-wire link 1612) from a transmitting device (e.g., transmitter 1602) 2002. Each symbol in the sequence of symbols may correspond to a signaling state of N wires of the multi-wire link, where N is an integer greater than 1. The receiving device further receives a clock signal (e.g., DDRCLK Y 1626) via a dedicated clock line (e.g., dedicated clock line 1622), wherein the dedicated clock line is separate from, and in parallel with, the multi-wire link 2004. The receiving device also decodes the sequence of symbols using the clock signal 2006.

In an aspect, a second clock signal DDRCLK X 1624) is embedded in guaranteed transitions between pairs of consecutive symbols in the sequence of symbols. Accordingly, the receiving device decodes the sequence of symbols using the clock signal received via the dedicated clock line while ignoring the second clock signal.

In an aspect, the receiving device decodes the sequence of symbols by converting the sequence of symbols to a set of data bits using the clock signal. In a further aspect, the receiving device performs the converting by using a transcoder transcoder 1640) to convert the sequence of symbols to a set of transition numbers and convert the set of transition numbers to the set of data bits.

In an aspect, at least one line of the multi-wire link is bi-directional. The receiving device may transmit a second sequence of symbols over the at least one bi-directional line based on the clock signal received via the dedicated clock line 2008. In a further aspect, both the receiving device and the transmitting device may utilize the multi-wire link for bi-directional transmissions by interleaving the lines of the multi-wire link.

In another aspect, the dedicated clock line is bi-directional and can be driven from any device transmitting over the multi-wire link. The receiving device may transmit a third clock signal via the dedicated clock line 2010. The third clock signal may be associated with a transmit clock used to encode data bits into a sequence of symbols transmitted by the receiving device over the at least one bi-directional line. In a further aspect, both the receiving device and the transmitting device may utilize the dedicated clock line by alternately transmitting a dedicated clock signal over the dedicated clock line.

Exemplary Transmitting Device and Method Thereon

Figure 21:
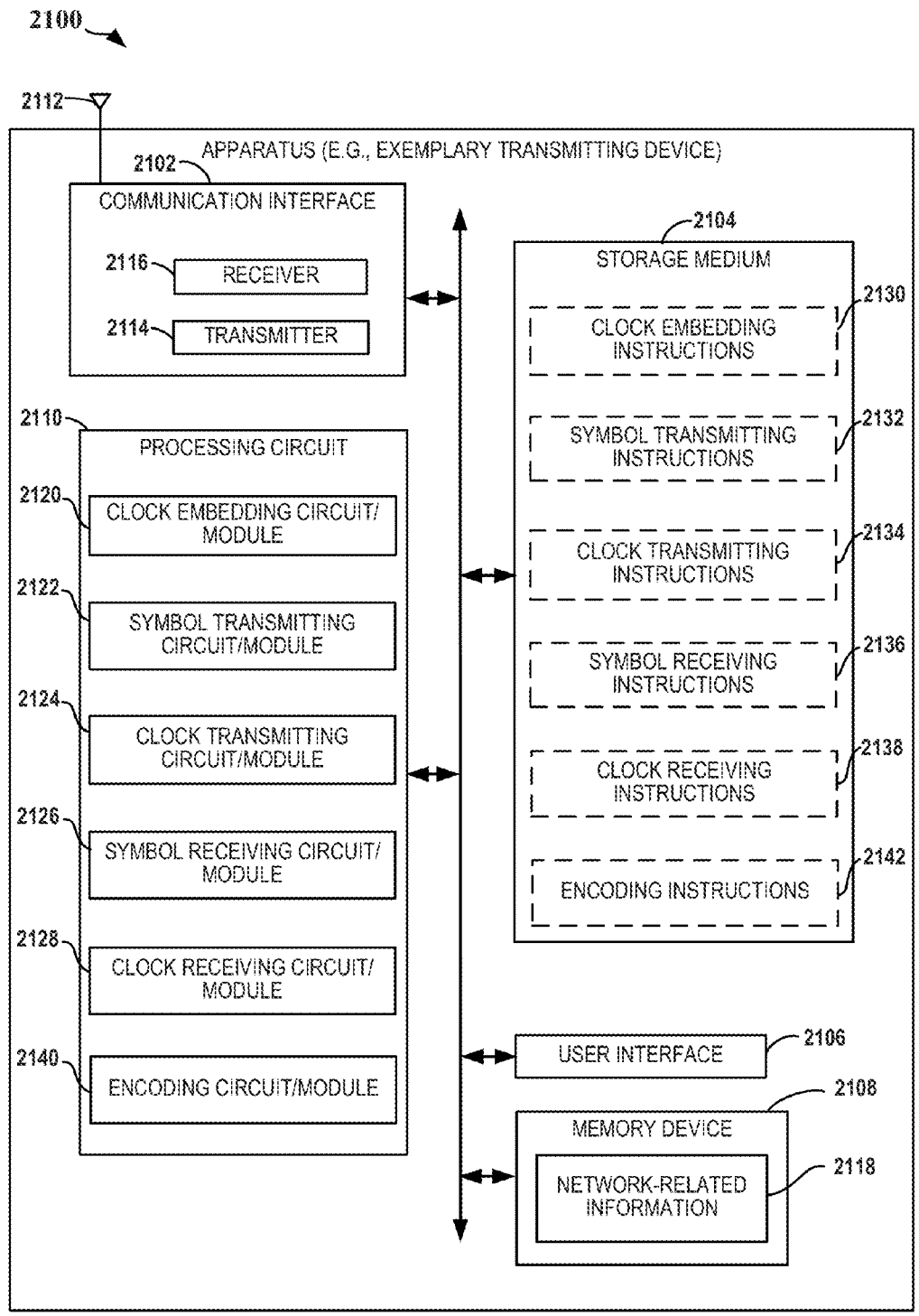
FIG. 21 is an illustration of an apparatus (transmitting device) configured to support operations related to communicating data bits over a multi-wire link according to one or more aspects disclosed herein.

FIG. 21 is an illustration of an apparatus (transmitting device) 2100 configured to support operations related to communicating data bits over a multi-wire link according to one or more aspects of the disclosure (e.g., aspects related to the method of FIG. 22 described below). The apparatus 2100 includes a communication interface (e.g., at least one transceiver) 2102, a storage medium 2104, a user interface 2106, a memory device 2108, and a processing circuit 2110.

These components can be coupled to and/or placed in electrical communication with one another via a signaling bus or other suitable component, represented generally by the connection lines in FIG. 21. The signaling bus may include any number of interconnecting buses and bridges depending on the specific application of the processing circuit 2110 and the overall design constraints. The signaling bus links together various circuits such that each of the communication interface 2102, the storage medium 2104, the user interface 2106, and the memory device 2108 are coupled to and/or in electrical communication with the processing circuit 2110. The signaling bus may also link various other circuits (not shown) such as timing sources, peripherals, voltage regulators, and power management circuits, which are well known in the art, and therefore, will not be described any further.

The communication interface 2102 may be adapted to facilitate wireless communication of the apparatus 2100. For example, the communication interface 2102 may include circuitry and/or code (e.g., instructions) adapted to facilitate the communication of information hi-directionally with respect to one or more communication devices in a network. The communication interface 2102 may be coupled to one or more antennas 2112 for wireless communication within a wireless communication system. The communication interface 2102 can be configured with one or more standalone receivers and/or transmitters, as well as one or more transceivers. In the illustrated example, the communication interface 2102 includes a transmitter 2114 and a receiver 2116.

The memory device 2108 may represent one or more memory devices. As indicated, the memory device 2108 may maintain network-related information 2118 along with other information used by the apparatus 2100. In some implementations, the memory device 2108 and the storage medium 2104 are implemented as a common memory component. The memory device 2108 may also be used for storing data that is manipulated by the processing circuit 2110 or some other component of the apparatus 2100.

The storage medium 2104 may represent one or more computer-readable, machine-readable, and/or processor-readable devices for storing code, such as processor executable code or instructions (e.g., software, firmware), electronic data, databases, or other digital information. The storage medium 2104 may also be used for storing data that is manipulated by the processing circuit 2110 when executing code. The storage medium 2104 may be any available media that can be accessed by a general purpose or special purpose processor, including portable or fixed storage devices, optical storage devices, and various other mediums capable of storing, containing or carrying code.

By way of example and not limitation, the storage medium 2104 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 2104 may be embodied in an article of manufacture (e.g., a computer program product). By way of example, a computer program product may include a computer-readable medium in packaging materials. In view of the above, in some implementations, the storage medium 2104 may be a non-transitory (e.g., tangible) storage medium.

The storage medium 2104 may be coupled to the processing circuit 2110 such that the processing circuit 2110 can read information from, and write information to, the storage medium 2104. That is, the storage medium 2104 can be coupled to the processing circuit 2110 so that the storage medium 2104 is at least accessible by the processing circuit 2110, including examples where at least one storage medium is integral to the processing circuit 2110 and/or examples where at least one storage medium is separate from the processing circuit 2110 (e.g., resident in the apparatus 2100, external to the apparatus 2100, distributed across multiple entities, etc.).

Code and/or instructions stored by the storage medium 2104, when executed by the processing circuit 2110, causes the processing circuit 2110 to perform one or more of the various functions and/or process operations described herein. For example, the storage medium 2104 may include operations configured for regulating operations at one or more hardware blocks of the processing circuit 2110, as well as to utilize the communication interface 2102 for wireless communication utilizing their respective communication protocols.

The processing circuit 2110 is generally adapted for processing, including the execution of such code/instructions stored on the storage medium 2104. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 2110 is arranged to obtain, process and/or send data, control data access and storage, issue commands, and control other desired operations. The processing circuit 2110 may include circuitry configured to implement desired code provided by appropriate media in at least one example. For example, the processing circuit 2110 may be implemented as one or more processors, one or more controllers, and/or other structure configured to execute executable code. Examples of the processing circuit 2110 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 2110 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 2110 are for illustration and other suitable configurations within the scope of the disclosure are also contemplated.

According to one or more aspects of the disclosure, the processing circuit 2110 may be adapted to perform any or all of the features, processes, functions, operations and/or routines for any or all of the apparatuses described herein. As used herein, the term "adapted" in relation to the processing circuit 2110 may refer to the processing circuit 2110 being one or more of configured, employed, implemented, and/or programmed to perform a particular process, function, operation and/or routine according to various features described herein.

Figure 22:
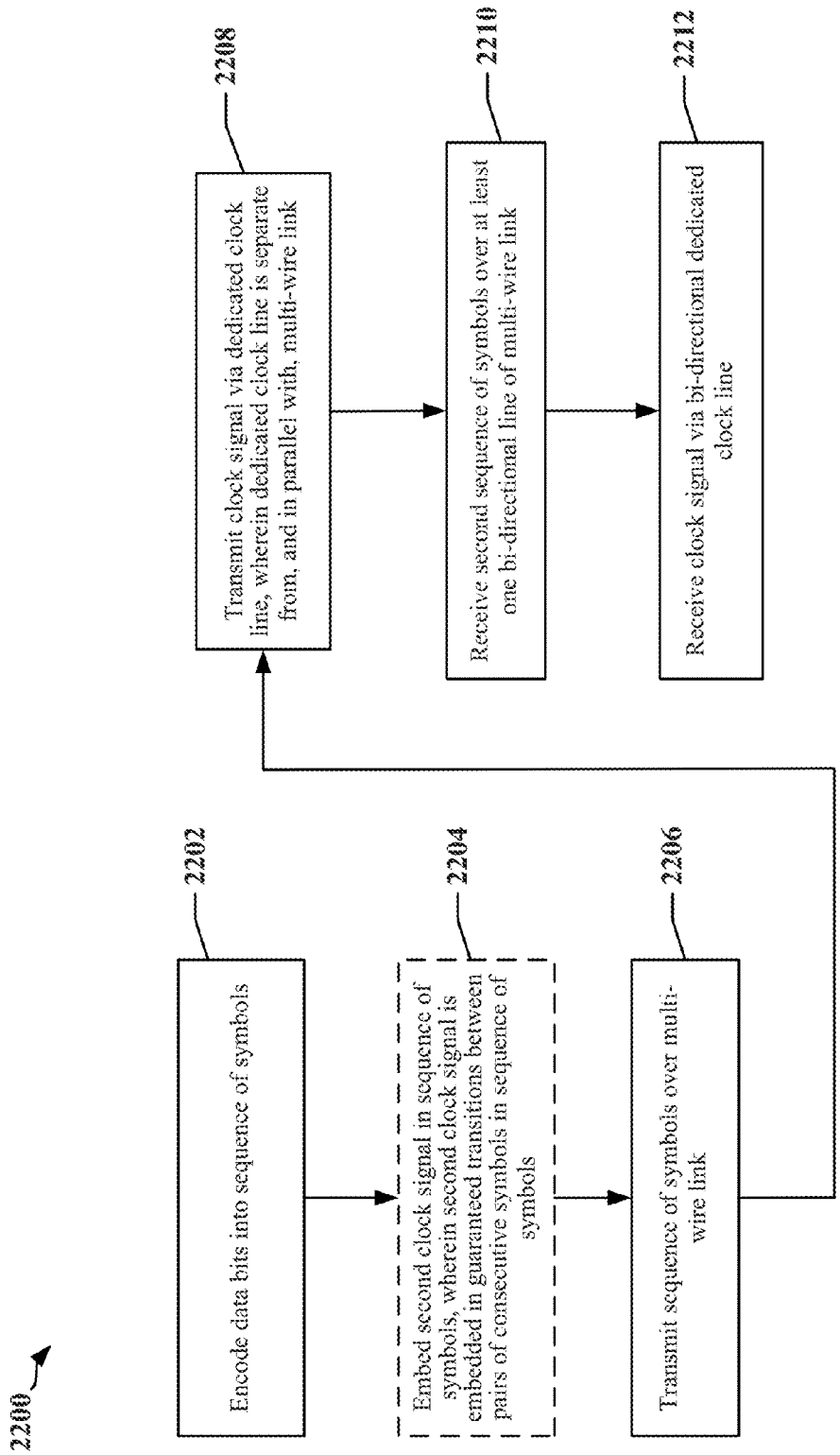
FIG. 22 is a flowchart illustrating a method of a transmitting device for communicating data bits over a multi-wire link.

According to at least one example of the apparatus 2100, the processing circuit 2110 may include one or more of a clock embedding circuit/module 2120, a symbol transmitting circuit/module 2122, a clock transmitting circuit/module 2124, a symbol receiving circuit/module 2126, a clock receiving circuit/module 2128, and an encoding circuit/module 2140 that are adapted to perform any or all of the features, processes, functions, operations and/or routines described herein (e.g., features, processes, functions, operations and/or routines described with respect to FIG. 22).

The encoding circuit/module 2140 may include circuitry and/or instructions (e.g., encoding instructions 2142 stored on the storage medium 2104) adapted to perform several functions relating to, for example, encoding data bits into a sequence of symbols. The encoding circuit/module 2140 may be configured to perform the encoding by converting the data bits to a set of transition numbers and converting the set of transition numbers to obtain the sequence of symbols.

The clock embedding circuit/module 2120 may include circuitry and/or instructions (e.g., clock embedding instructions 2130 stored on the storage medium 2104) adapted to perform several functions relating to, for example, embedding a second clock signal in the sequence of symbols, wherein the second clock signal is embedded in guaranteed transitions between pairs of consecutive symbols in the sequence of symbols.

The symbol transmitting circuit/module 2122 may include circuitry and/or instructions (e.g., symbol transmitting instructions 2132 stored on the storage medium 2104) adapted to perform several functions relating to, for example, transmitting the sequence of symbols over a multi-wire link.

The clock transmitting circuit/module 2124 may include circuitry and/or instructions (e.g., clock transmitting instructions 2134 stored on the storage medium 2104) adapted to perform several functions relating to, for example, transmitting a clock signal associated with the sequence of symbols via a dedicated clock line, wherein the dedicated clock line is separate from, and in parallel with, the multi-wire link.

The symbol receiving circuit/module 2126 may include circuitry and/or instructions (e.g., symbol receiving instructions 2136 stored on the storage medium 2104) adapted to perform several functions relating to, for example, receiving a second sequence of symbols over at least one bi-directional line of the multi-wire link based on the clock signal transmitted via the dedicated clock signal.

The clock receiving circuit/module 2128 may include circuitry and/or instructions (e.g., clock receiving instructions 2138 stored on the storage medium 2104) adapted to perform several functions relating to, for example, receiving a third clock signal via the dedicated clock line. The third clock signal may be associated with a transmit clock used to encode data bits into a sequence of symbols received by the symbol receiving circuit/module 2126 over the at least one bi-directional line of the multi-wire link.

As mentioned above, instructions stored by the storage medium 2104, when executed by the processing circuit 2110, causes the processing circuit 2110 to perform one or more of the various functions and/or process operations described herein. For example, the storage medium 2104 may include one or more of the clock embedding instructions 2130, the symbol transmitting instructions 2132, the clock transmitting instructions 2134, the symbol receiving instructions 2136, the clock receiving instructions 2138, and the encoding instructions 2142.

FIG. 22 is a flowchart 2200 illustrating a method of communicating data bits over a multi-wire link. The method may be performed by a transmitting device (e.g., apparatus 100 of FIG. 1, transmitter 1602 of FIG. 16, or apparatus 2100 of FIG. 21).

The transmitting device encodes data bits (e.g., Bits X 1604) into a sequence of symbols 2202. Additionally or optionally, the transmitting device embeds a second clock signal (e.g., DDRCLK. X 1624) in the sequence of symbols, wherein the second clock signal is embedded in guaranteed transitions between pairs of consecutive symbols in the sequence of symbols 2204. Each symbol in the sequence of symbols may correspond to a signaling state of N wires of a multi-wire link (e.g., multi-wire link 1612), where N is an integer greater than 1. The transmitting device further transmits the sequence of symbols over the multi-wire link 2206. The transmitting device also transmits a clock signal (e.g., DDRCLK Y 1626) associated with the sequence of symbols via a dedicated clock line (e.g., dedicated clock line 16221, wherein the dedicated clock line is separate from, and in parallel with, the multi-wire link 2208.

In an aspect, the transmitting device encodes the data bits into the sequence of symbols by using a transcoder (e.g., transcoder 1606) to convert the data bits to a set of transition numbers and converting the set of transition numbers to the sequence of symbols.

In an aspect, at least one line of the multi-wire link is bi-directional. The transmitting device may receive, from a receiving device, a second sequence of symbols over the at least one bi-directional line 2210. In a further aspect, both the receiving device and the transmitting device may utilize the multi-wire link for bi-directional transmissions by interleaving the lines of the multi-wire link.

In another aspect, the dedicated clock line is bi-directional and can be driven from any device transmitting over the multi-wire link. The transmitting device may receive a third clock signal via the dedicated clock line. The third clock signal may be associated with a transmit clock used to encode data hits into a sequence of symbols received by the transmitting device over the at least one bi-directional line 2212. In a further aspect, both the receiving device and the transmitting device may utilize the dedicated clock line by alternately transmitting a dedicated clock signal over the dedicated clock line.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A receiving device, comprising:
   a transcoder configured to convert symbols to transition numbers, wherein each symbol represents signaling state of a multi-wire link, and wherein each transition number characterizes a difference between a pair of consecutive symbols; and
   a processing circuit configured to:
      receive a sequence of symbols from the multi-wire link,
      receive a clock signal via a dedicated clock line, wherein the dedicated clock line is separate from, and in parallel with, the multi-wire link, and
      decode the sequence of symbols using the clock signal and the transcoder.

2. The receiving device of claim 1, wherein:
   a second clock signal is embedded in guaranteed transitions between pairs of consecutive symbols in the sequence of symbols, and
   the processing circuit is configured to decode the sequence of symbols using the clock signal received via the dedicated clock line while ignoring the second clock signal.

3. The receiving device of claim 1, wherein the processing circuit is further configured to convert the sequence of symbols to a set of data bits using the clock signal and an output of the transcoder.

4. The receiving device of claim 1, wherein the processing circuit is further configured to:
   use the transcoder to convert the sequence of symbols to a set of transition numbers; and
   convert the set of transition numbers to a set of data bits.

5. The receiving device of claim 1, wherein each symbol in the sequence of symbols corresponds to a signaling state of N wires of the multi-wire link, where N is an integer greater than 1.

6. The receiving device of claim 1, wherein at least one line of the multi-wire link is bi-directional.

7. The receiving device of claim 6, the processing circuit further configured to transmit a second sequence of symbols over the at least one bi-directional line based on the clock signal received via the dedicated clock line.

8. The receiving device of claim 7, wherein the dedicated clock line is bi-directional and can be driven from any device transmitting over the multi-wire link.

9. A method of data communications at a receiving device, comprising:
   receiving a sequence of symbols over a multi-wire link;
   receiving a clock signal via a dedicated clock line, wherein the dedicated clock line is separate from, and in parallel with, the multi-wire link; and
   decoding the sequence of symbols using the clock signal and a transcoder,
   wherein the transcoder is configured to convert symbols to transition numbers,
   wherein each symbol represents signaling state of a multi-wire link, and
   wherein each transition number characterizes a difference between a pair of consecutive symbols.

10. The method of claim 9, wherein:
    a second clock signal is embedded in guaranteed transitions between pairs of consecutive symbols in the sequence of symbols, and
    the sequence of symbols is decoded using the clock signal received via the dedicated clock line while ignoring the second clock signal.

11. The method of claim 9, wherein the decoding includes converting the sequence of symbols to a set of data bits using the clock signal.

12. The method of claim 11, wherein the converting the sequence of symbols to the set of data bits includes:
    using the transcoder to convert the sequence of symbols to a set of transition numbers; and
    converting the set of transition numbers to the set of data bits.

13. The method of claim 9, wherein each symbol in the sequence of symbols corresponds to a signaling state of N wires of the multi-wire link, where N is an integer greater than 1.

14. The method of claim 9, wherein at least one line of the multi-wire link is bi-directional.

15. The method of claim 14, further including transmitting a second sequence of symbols over the at least one bi-directional line based on the clock signal received via the dedicated clock line.

16. The method of claim 15, wherein the dedicated clock line is bi-directional and can be driven from any device transmitting over the multi-wire link.

17. A transmitting device, comprising:
    a transcoder configured to convert transition numbers to symbols, wherein each symbol represents signaling state of a multi-wire link, and wherein each transition number characterizes a difference between a pair of consecutive symbols; and
    a processing circuit configured to:
       encode data bits into a sequence of symbols using the transcoder,
       transmit the sequence of symbols over a multi-wire link, and
       transmit a clock signal associated with the sequence of symbols via a dedicated clock line, wherein the dedicated clock line is separate from, and in parallel with, the multi-wire link.

18. The transmitting device of claim 17, the processing circuit further configured to use the transcoder to embed a second clock signal in the sequence of symbols, wherein the second clock signal is embedded in guaranteed transitions between pairs of consecutive symbols in the sequence of symbols.

19. The transmitting device of claim 17, wherein the processing circuit is further configured to:
  convert the data bits to a set of transition numbers; and
  use the transcoder to convert the set of transition numbers to obtain the sequence of symbols.

20. The transmitting device of claim 17, wherein each symbol in the sequence of symbols corresponds to a signaling state of N wires of the multi-wire link, where N is an integer greater than 1.

21. The transmitting device of claim 17, wherein at least one line of the multi-wire link is bi-directional.

22. The transmitting device of claim 21, the processing circuit further configured to receive a second sequence of symbols over the at least one bi-directional line based on the clock signal transmitted via the dedicated clock line.

23. The transmitting device of claim 22, wherein the dedicated clock line is bi-directional and can be driven from any device transmitting over the multi-wire link.

24. A method of data communications at a transmitting device, comprising:
  using a transcoder to encode data bits into a sequence of symbols;
  transmitting the sequence of symbols over a multi-wire link; and
  transmitting a clock signal associated with the sequence of symbols via a dedicated clock line, wherein the dedicated clock line is separate from, and in parallel with, the multi-wire link,
  wherein the transcoder is configured to convert transition numbers to symbols,
  wherein each symbol represents signaling state of a multi-wire link, and
  wherein each transition number characterizes a difference between a pair of consecutive symbols.

25. The method of claim 24, further comprising embedding a second clock signal in the sequence of symbols, wherein the second clock signal is embedded in guaranteed transitions between pairs of consecutive symbols in the sequence of symbols.

26. The method of claim 24, wherein the encoding the data bits includes:
  converting the data bits to a set of transition numbers; and
  using the transcoder to convert the set of transition numbers to obtain the sequence of symbols.

27. The method of claim 24, wherein each symbol in the sequence of symbols corresponds to a signaling state of N wires of the multi-wire link, where N is an integer greater than 1.

28. The method of claim 24, wherein at least one line of the multi-wire link is bi-directional.

29. The method of claim 28, further including receiving a second sequence of symbols over the at least one bi-directional line based on the clock signal transmitted via the dedicated clock line.

30. The method of claim 29, wherein the dedicated clock line is bi-directional and can be driven from any device transmitting over the multi-wire link.

* * * * *